United States Patent
Spillane et al.

(10) Patent No.: US 10,812,582 B2
(45) Date of Patent: Oct. 20, 2020

(54) MANAGEMENT OF APPLICATIONS ACROSS NODES USING EXO-CLONES

(71) Applicant: VMware, Inc., Palo Alto, CA (US)

(72) Inventors: Richard Spillane, Palo Alto, CA (US); Yunshan Luke Lu, San Jose, CA (US); Wenguang Wang, Palo Alto, CA (US); Maxime Austruy, Lausanne (CH); Christos Karamanolis, Los Gatos, CA (US); Rawlinson Rivera, Van Nuys, CA (US)

(73) Assignee: VMware, Inc., Palo Alto, CA (US)

( * ) Notice: Subject to any disclaimer, the term of this patent is extended or adjusted under 35 U.S.C. 154(b) by 405 days.

(21) Appl. No.: 15/191,228

(22) Filed: Jun. 23, 2016

(65) Prior Publication Data
US 2017/0264684 A1    Sep. 14, 2017

Related U.S. Application Data

(60) Provisional application No. 62/306,416, filed on Mar. 10, 2016.

(51) Int. Cl.
*G06F 16/00* (2019.01)
*H04L 29/08* (2006.01)
(Continued)

(52) U.S. Cl.
CPC ...... *H04L 67/1095* (2013.01); *G06F 9/45558* (2013.01); *G06F 16/128* (2019.01);
(Continued)

(58) Field of Classification Search
CPC combination set(s) only.
See application file for complete search history.

(56) References Cited

U.S. PATENT DOCUMENTS

| | | | | |
|---|---|---|---|---|
| 8,285,898 B2 * | 10/2012 | Amit | ...... | G06F 16/00 710/68 |
| 8,327,050 B2 * | 12/2012 | Amit | ...... | G06F 16/00 710/68 |

(Continued)

OTHER PUBLICATIONS

Unknown, "Design notes on Send/Receive", Btrfs, last modified May 27, 2015, https://btrfs.wiki.kernel.org/index.php/Design_notes_on_Send/Receive, 4 pages.
Unknown, "Layers", Docker, Inc., 2014, https://docs.docker.com/v1.6/terms/layer/, 2 pages.
Agarwal et al., "Docker Image Specification v1.0.0", Github, last modified Feb. 11, 2016, https://github.com/locker/docker/blob/master/image/spec/v1.md, 7 pages.

(Continued)

*Primary Examiner* — Farhan M Syed

(57) ABSTRACT

Examples disclosed herein relate to propagating changes made on a file system volume of a primary cluster of nodes to the same file system volume also being managed by a secondary cluster of nodes. An application is executed on both clusters, and data changes on the primary cluster are mirrored to the secondary cluster using an exo-clone file. The exo-clone file includes the differences between two or more snapshots of the volume on the primary cluster, along with identifiers of the change blocks and (optionally) state information thereof. Just these changes, identifiers, and state information are packaged in the exo-clone file and then exported to the secondary cluster, which in turn makes the changes to its version of the volume. Exporting just the changes to the data blocks and the corresponding block identifiers drastically reduces the information needed to be exchanged and processed to keep the two volumes consistent.

20 Claims, 10 Drawing Sheets

(51) Int. Cl.
　　　*G06F 9/455*　　　(2018.01)
　　　*G06F 16/11*　　　(2019.01)
　　　*G06F 16/178*　　(2019.01)
(52) U.S. Cl.
　　　CPC .... *G06F 16/178* (2019.01); *G06F 2009/4557* (2013.01); *G06F 2009/45562* (2013.01); *G06F 2009/45595* (2013.01)

(56) References Cited

U.S. PATENT DOCUMENTS

| | | | | |
|---|---|---|---|---|
| 8,473,652 | B2* | 6/2013 | Amit | G06F 16/00 710/68 |
| 8,656,075 | B2* | 2/2014 | Amit | G06F 16/00 710/68 |
| 8,677,039 | B2* | 3/2014 | Amit | G06F 16/00 710/68 |
| 9,479,587 | B2* | 10/2016 | Bestler | H04L 67/1097 |
| 9,946,603 | B1* | 4/2018 | Kumar | G06F 16/148 |
| 9,996,429 | B1* | 6/2018 | Kumar | G06F 11/1451 |
| 10,078,555 | B1* | 9/2018 | Kumar | G06F 16/188 |
| 2008/0177994 | A1* | 7/2008 | Mayer | G06F 9/4418 713/2 |
| 2011/0218970 | A1* | 9/2011 | Amit | G06F 16/00 707/679 |
| 2011/0218975 | A1* | 9/2011 | Amit | G06F 16/00 707/693 |
| 2011/0219144 | A1* | 9/2011 | Amit | G06F 16/00 709/247 |
| 2012/0265740 | A1* | 10/2012 | Amit | G06F 16/00 707/693 |
| 2014/0304357 | A1* | 10/2014 | Bestler | G06F 16/27 709/213 |
| 2014/0310243 | A1* | 10/2014 | McGee | G06Q 10/101 707/639 |
| 2015/0143064 | A1† | 5/2015 | Bhargava et al. | |
| 2015/0370641 | A1* | 12/2015 | Susairaj | G06F 3/0619 707/645 |
| 2016/0292041 | A1* | 10/2016 | Bender | G06F 11/1435 |
| 2019/0073510 | A1* | 3/2019 | West | G06T 7/0012 |

OTHER PUBLICATIONS

Unknown, "Docker Layer Overload", Extellisys, 2014, http://www.extellisys.com/articles/docker-layer-overload, 4 pages.
Unknown, "FlatBuffers Documentation", FlatBuffers, captured Jun. 6, 2016, https://google.github.io/flatbuffers/, 4 pages.
Unknown, "git-annex", Branchable, captured Jun. 6, 2016, http://git-annex.branchable.com/, 3 pages.
Unknown, "Git Large File Storage", Github, captured Jun. 6, 2016, https://git-lfs.github.com/, 4 pages.
Unknown, "Handling Large Media Files in Git", Github, captured Jun. 6, 2016, https://github.com/alebedev/git-media, 3 pages.
Unknown, "NetApp SnapVault", NetApp, captured Jun. 6, 2016, http://www.netapp.com/us/products/protection-software/snapvault.aspx, 3 pages.
Unknown, "Perforce", Wikipedia, last modified May 13, 2016, https://en.wikipedia.org/wiki/Perforce, 7 pages.
Unknown, "Sending and Receiving ZFS Data", Oracle, 2006, https://docs.oracle.com/cd/E18752_01/pdf/819-5461.pdf, 312 pages.
Unknown, "Virtual SAN", VMware, Inc., 2016, http://www.vmware.com/products/virtual-san, 5 pages.
Unknown, "VMware App Volumes. Reference Architecture VMware App vols. 2.10", VMware, Inc., 2015, 50 pages.
Unknown, "What is Docker?", Docker, Inc., 2015, https://www.docker.com/what-docker, 9 pages.
Eskildsen, Simon Horup, "Why Docker is Not Yet Succeeding Widely in Production", Jul. 2015, http://sirupsen.com/production-docker/, 6 pages.
Unknown, "Vulnerabilities: Do We Need Those Stinking Patches?", Data Breach Investigations Report, Verizon and 70 other organizations, 2015, pp. 15-17.
Weil et al., "Rados: A Scalable, Reliable Storage Service for Petabytescale Storage Clusters", In Proceedings of the 2nd International Workshop on Petascale Data Storage: Held in Conjunction with Supercomputing '07, PDSW '07, pp. 35-44, New York, NY, USA, 2007, ACM, 10 pages.
Wright et al., "Versatility and UNIX Semantics in Namespace Unification", ACM Transactions on Storage (TOS), 2 (1): 1-32, Feb. 2006, 29 pages.

\* cited by examiner
† cited by third party

MANAGEMENT OF APPLICATIONS ACROSS NODES USING EXO-CLONES

CROSS REFERENCE TO RELATED APPLICATIONS

This application claims the benefit of U.S. Provisional Patent Application Ser. No. 62/306,416, entitled "Container Runtime Image Management Across the Cloud" and filed on Mar. 10, 2016, which is incorporated by reference herein in its entirety for all intents and purposes.

BACKGROUND

Organizations must deploy and manage applications like mail servers, databases, file servers, and web servers while at the same time securing, developing, updating, and tuning (for performance) these applications as they run on their networks and storage infrastructure. When an application is serving its end-users, it is in production and the operator must be able to monitor the application, tune its performance, set storage and networking policies or service-level-agreements, migrate it, and recover it if it crashes. When an application is being modified to improve security or add features, it is in development and the developer must be able to rapidly build and deploy the application in a test mode where it will behave as similarly as possible to how it executes in production, and can be inspected and debugged as it runs.

One existing approach to transferring changes to a file system is to pack these changes into an archive and compress the archive. This is the approach used by container systems such as Docker or Rocket to send container layers (a kind of container dependency). Docker containers provide an alternative portable format that produces much smaller encapsulated files or container images than open virtualization format (OVF) style virtual appliances. But conventional Docker containers lack mature and powerful software for deploying these containers and tracking changes to them over time, because these systems have to resend an entire image if even one byte of one file is changed, even if the receiving party has an older version that is mostly the same. This wastes significant processing time, bandwidth, and resources when the image itself is largely unchanged.

Moreover, conventional Docker and Rocket containers fall short in treating applications that are in the production and development state in the same way. These containers struggle to provide efficient "stateful" container instances that can manage running deployed applications as elegantly as Docker container images manage applications in the development cycle.

Not only do applications typically run either in production or in development, but they do so typically in different environments (e.g., single developer workstation, a test environment, and a production environment). Therefore, organizations must manage complex interconnected applications that must run in very different states (production and development) across multiple environments.

Moreover, when an application is being developed, it is often built on a small development cluster, and is later deployed to a test cluster for testing. During the development, the application is frequently modified, built, deployed, and tested. Reducing the time spent on the development cycle can significantly increase developers' productivity. The traditional ad-hoc method cannot keep up with today's fast paced development activity. Packing applications using virtual machines (VMs) and sending VM images to test clusters is cumbersome due to the large size of VM disk images.

Docker uses containers as a light weight virtualization mechanism to build a more efficient deployment workflow. The Docker image is used as a new application packaging format. It contains layers of disk images which are combined together by a Docker build process. In a typical Docker image, the base layer is the operating system, the middle layers are libraries (e.g., Python, Java, etc.), and the top layer is the application binary being developed. After the application code is changed, the top layer is rebuilt into a Docker image, pushed to the centralized Docker registry, and then copied to each node in the test cluster via docker pull before the new fix can be tested. Usually only a small part of the application binary is changed in each iteration. However, Docker builds and pushes the whole top layer image to the Docker registry, and every node needs to pull the new top layer image before it can be used. These pushes and pulls reduces developers' productivity.

SUMMARY

The disclosed examples are described in detail below with reference to the accompanying drawing figures listed below. The below Summary is provided to illustrate some examples disclosed herein, and is not meant to necessarily limit all examples to any particular configuration or sequence of operations.

Some examples disclosed herein are directed to migrating a distributed application across from a primary cluster to a secondary cluster that are both running the distributed application. To do so, at least one embodiment takes snapshots of the volume on the primary cluster and the secondary cluster. A difference (diff) operation is performed on the snapshot of the volume to determine differences to block chains of data in the volume on the primary cluster. An exo-clone file is created that includes only the differences to the one or more block chains of data of the primary cluster, an identifier of the blocks that have been changed, and (optionally) various state information of the changed data. The exo-clone file may then be exported to the secondary cluster, which in turn applies the differences to the block chains of data in the volume on the secondary cluster. These changed blocks are identified on the secondary cluster using the block identifiers in the exo-clone file.

BRIEF DESCRIPTION OF THE DRAWINGS

The disclosed embodiments are described in detail below with reference to the accompanying drawing figures listed below.

DETAILED DESCRIPTION

Figure 1:
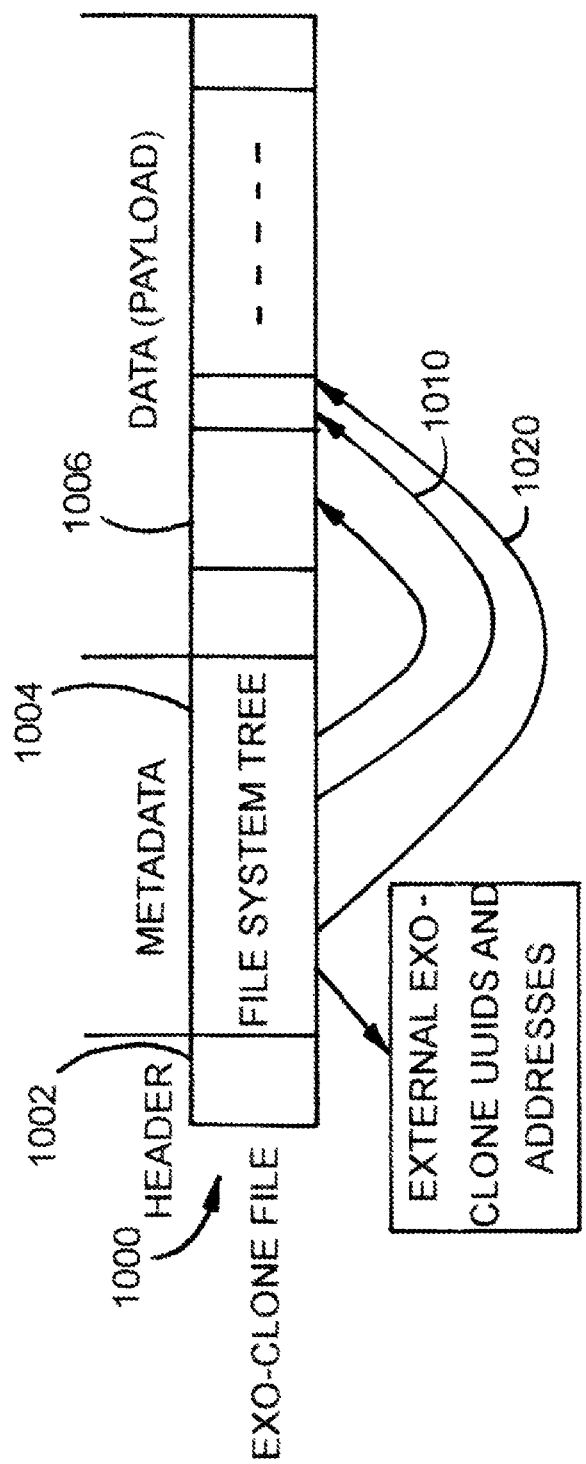
FIG. 1 is an example block diagram of an exo-clone file format.

Embodiments disclosed herein provide container runtime image management across the cloud. The present disclosure enables an organization's storage infrastructure to treat applications in production and development, across multiple environments, in the same way, using a common set of tools that manipulate a single storage object, referred to as an exo-clone. An exo-clone, in some examples, is a volume clone that lives outside of a file system, such as a Virtual Distributed File System (VDFS) file system, as a regular file. Exo-clones dramatically reduce the size of images transferred over the network. Exo-clones may be deduplicated against older versions of the same volume; thus, the exo-clone only includes the blocks of data not present in the older version of the same volume that the receiving party already has. Thus, in some examples, an exo-clone may be up to an order of magnitude smaller than re-sending the original layer, dramatically reducing traffic on valuable network resources such as switches, routers, interconnects, and other processing and communications equipment. In effect, the exo-clone files disclosed herein may be used to provide a standard way of transmitting updates of file systems, including corresponding state information for underlying saved data, from one file system to another without having to transmit images of the file systems.

Exo-clones are volume clones that include the differences to the volumes from one point in time to another. Thus, exo-clones are far smaller than images of a particular shared volume itself, because exo-clones include just the differences in the volumes along with specific identifiers indicating the shared volume to which the exo-clone differences are related. For example, if a shared volume is hosted on a first cluster of nodes and a second cluster of nodes, changes made to the shared volume on the first cluster may be packaged in an exo-clone along with an identifier of the shared volume to which the changes relate, and then exo-clone may be transmitted to the second cluster for implementation of the changes to the shared volume managed thereon. Additionally, as discussed in more detail below, state information about the changed data may also be included in the exo-clones along with data changes, and parent storage identifiers, in some examples.

For purposes of this disclosure, some example embodiments are described as having: (1) primary or parent storage or cluster, and (2) receiving or secondary storage or cluster. The primary storage and cluster respectively refer to the storage and cluster from which the exo-clone captures data differences. State information and identifiers for the parent storage and/or clusters used to produce the exo-clones disclosed herein. The secondary storage and clusters respectively refer to the storage and clusters that are storing or accessing the shared storage and that are implementing the data differences in the exo-clones. For example, an exo-clone may capture differences to the data in cluster A, package those differences in an exo-clone along with an identifier of cluster, and transmit the exo-clone to cluster B, which in turn updates it managed data to reflect the differences in the exo-clone.

Some embodiments create and propagate an exo-clone from a primary storage to a secondary storage in the following manner. Initially, a clone of the volume of the primary storage is created. Changes are made to the created clone volume of the primary storage. A universally unique identifier (UUID) of the primary storage is retrieved (or determined) and associated with the cloned volume of the primary storage to allow for zero-copy. Any unique UUID may also be assigned to the cloned volume as well. Then, when other machines request to create an exo-clone file of the cloned volume, the UUID-identified parent storage is accessed, a diff is calculated therefrom, and difference blocks are exported from the primary storage, and the difference blocks are included in the exo-clone, which is transmitted to the secondary storage or cluster for propagation of the difference blocks.

Put another way, an exo-clone file may include a metadata section and a payload section. In some embodiments, the metadata section may include the UUID of the primary storage or cluster, and the payload section may include the changed data blocks that are the result of a diff operation performed on the primary storage or cluster. Alternatively, the UUID of the primary may be included in the payload section.

To use exo-clones, an organization deploys VDFS on their storage infrastructure in each of their environments. VDFS is a distributed file system supporting modern features such as scalable file clones, volume snapshots, and volume clones. VDFS can support multiple backends including virtual storage area network (VSAN) or through a reliable autonomic distrusted object store (RADOS), or even by way of a portable operating system interface (POSIX) directory, thus allowing it to be deployed on-premises, in a public cloud, or on a developer workstation. When an exo-clone is created to transmit or migrate a volume from VDFS to either another VDFS or a third party system managing a set of exo-clones, VDFS can factor in what common content already exists on the receiving end to craft a minimal binary diff which can be much smaller than even a Docker container. In some embodiments, exo-clones also contain descriptive policy information about their storage capacity, performance, and availability requirements to ensure that applications running on them will run in the same fashion regardless of their mode of operation (e.g., production or text/development).

As mentioned above, conventional Docker containers provide an alternative portable format that produces much smaller encapsulated files or container images than open virtualization format (OVF) style virtual appliances, but are lacking mature and powerful software for deploying these containers and tracking changes to them over time. The embodiments of the present disclosure contemplate an encapsulation format that works natively with a comprehensive management solution that provides the best of both worlds. These embodiments allow volume snapshots of a VDFS to be exported to a stand-alone exo-clone file that can be imported to another VDFS cluster efficiently (zero-copy when possible).

Exo-clones carry provenance, policy, and the fingerprints of the parent clones from which they were derived. In some examples, exo-clones operate in a distributed source control system, and can be stored outside of VDFS, rebased, and signed. Although exo-clones can be unpacked to any directory, when used with VDFS, exo-clones are mounted directly with zero-copying and are instantly available to all nodes mounting VDFS. VDFS automatically configures a VSAN to use the appropriate policy with the newly imported clone, and provides expressive primitives for configuring access control. VDFS with exo-clones provides both the format and the tools necessary to both transfer and run encapsulated applications in both public and private clouds, and in both test/development and production environments.

In some embodiments, exo-clones build on top of a VDFS file system service. VDFS is a hyper-converged distributed POSIX file system with advanced features such as file clones, volume clones, and volume snapshots. A few more features are added to the VDFS product plan to better support exo-clones. These features and how they are used by exo-clones are discussed below.

1. File Clone. A file can be cloned to another file on the same volume or different volume. Future writes to any of the cloned files use copy-on-write (COW) to preserve contents of unmodified files. As discussed below, exo-clones rely on file clone to efficiently implement merging and rebasing.
2. Volume Snapshot. One VDFS instance can contain unbounded number of volumes. A volume is a collection of folders and unit of access control. A series of snapshots can be made on the "live" version of a volume which captures the state of the volume at a point in time. Snapshots are writable so that old data in snapshots can be removed if needed. Writable snapshots are important to satisfy certain data retention policies. Writes to the live version or any snapshots of a volume uses COW to avoid unnecessary data copy.
3. Volume Clone. Any snapshot of a volume can be cloned to a new volume which can have new access control information attached. Any updates to the original volume or cloned volume use COW to avoid unnecessary data copy.
4. Snapshot Diff. The difference between two snapshots of a volume can be efficiently calculated, which has a cost proportional to the amount of metadata changed between them, such as number of files or directories changed. The diff contains both meta-data changes (e.g., file creation, directory rename) and changed file data. This feature supports efficiently generating exo-clones.
5. Block-based Compression. Each 4 KB file data block (or other size data block) may be compressed into a smaller chunk. File metadata can point to the compressed block directly when reading. Writing to compressed blocks is redirected elsewhere. This feature allows exo-clones to occupy less space.

The current version of VDFS already supports file clone, volume snapshot and volume clone. As shown in Table 1, it is very fast to copy a file or volume, regardless of the amount of data to be cloned or snapshotted.

TABLE 1

Performance of VDFS Advanced Features.

| Command | Data Size | Time (Seconds) |
|---|---|---|
| Clone File | 8 GB | 0.014 |
| Clone Volume | 8 GB | 0.012 |
| Snapshot Volume | 8 GB | 0.013 |
| Copy File | 2 GB | 6 |
| Copy File | 4 GB | 11.9 |
| Copy File | 8 GB | 21.5 |

The above tests were conducted on an APPLE brand SSD SM0512F with a VDFS change-set 4009947.

Using the disclosed examples and embodiments, organizations do not need to install VDFS everywhere the organizations use exo-clones. An exo-clone is just a regular file that can be easily transmitted, stored, backed up, shared, or distributed with other third-party (non-VDFS) systems. For example, an organization can back up a volume to S3 by merely uploading periodically taken exo-clones of that volume to S3 as regular files. This is easy to do as S3 has many existing tools and APIs for uploading regular files.

Exo-clones provide organizations seeking to simplify their application management problems the first order of support: allowing existing applications that are not stateless to be run alongside new less-stateful applications and to be migrated just as easily across multiple environments. For example, with exo-clones it is easy to make a clone of, e.g., a database application run by a bank, while the original continues to run, and then migrate that clone to a test mode where it can be actively tested against, even using the same policies that it is run with in production. Exo-clones track applications, regardless of whether they are in production or development, across multiple environments, in the same way.

Exo-clones allow a more efficient solution to support this common application development cycle. With exo-clones, only the blocks changed since the previous top layer need to be sent to a test, or other secondary, cluster. A central registry is no longer required because the exo-clone patch can be sent to the test nodes using any method. When the exo-clone patch is applied, the zero-copy nature of the patch allows efficient patching and rebasing without moving any file data.

Table 2 illustrates the difference between the two workflows, assuming the application image is 100 MB, and every time 1 MB is changed in a development cycle.

TABLE 2

Compare Docker and Exo-Clone Workflow.

| Docker | Exo-clone |
|---|---|
| Edit source and build application binary | Edit source and build application binary |
| Build top layer Docker image # wrote 100 MB | Generate exo-clone file # wrote 1 MB |
| docker push # 100 MB | Copy exo-clone to testcluster # 1 MB copied |
| | Merge exo-clone # no data copy |
| For each test node: # assume 10 nodes | For each test node: # assume 10 nodes |
| docker pull # 100 MB copied | clone application binary # make it writable |
| test application binary | test application binary |

More specifically, Table 2 shows one development/text cycle. Docker wrote 1100 MB, while the exo-clone only wrote 2 MB.

Data backup is an important feature of any enterprise storage system. To achieve disaster tolerance, data on the main site needs to be continuously backed up to a remote site. If the main site fails, the service can be restored from the data in the remote site.

Exo-clones can be used to support data backup efficiently. In one embodiment snapshots are created periodically on a main site (or cluster). Once a snapshot is created, its diff from a previous snapshot is calculated, and an exo-clone is generated from the calculated diff. The exo-clone can be sent to the remote site and then applied to the remote storage without data copy.

Because almost every storage solution has an API for storing regular files, and because the exo-clone is just a regular file, it is easy to augment VDFS with an efficient, custom incremental backup solution. For example, if an operator or customer wants to schedule incremental backups of a VDFS volume to a public cloud, the customer may upload the regularly created exo-clones to, e.g., S3.

Like git commits, inspection operations can be performed on exo-clones with user-level tools. For example, backups in a third-party storage system can be verified as having all necessary ancestors for restoration without the third-party storage system needing the capability to mount or understand the exo-clone format.

It is possible to mount compressed VDFS exo-clones as read-only snapshots, as long as the exo-clones are compressed on a per-block basis. This allows users to quickly access their data from the recovery site.

Existing applications benefit from the speed of development and deployment that are afforded by composing applications together with containers. However, existing applications must rely on the underlying storage and deployment infrastructure to achieve availability and fault tolerance and when they migrate from on-premise to public clouds, they must be migrated with their state (e.g., locally modified My SQL or Mongo database instances). Docker does not currently support stateful containers and has no support for specifying availability, performance, or fault tolerance policies.

VDFS exo-clones are just volumes, and so can be modified by applications and then migrated, allowing applications to be migrated with their state. VDFS exo-clones can also include information about the application's fault tolerance, performance, capacity, and availability requirements. This policy information is applied using, for example, the Storage Policy-Based Management (SPBM) framework when the exo-clone is mounted on VDFS running on top of VSAN.

For example, a banking application can run a critical database in a container that is marked as withstanding up to three storage failures and is 50% read cached in the flash tier (when present). Because the volume is also the state of the application, the application can be live-migrated with its state, such as with Storage vMotion, to another cluster. Or perhaps a developer wants to test against a live copy of the database, then the application can be instantly duplicated, and the duplicate can be migrated to a separate development storage cluster.

Exo-clones may exist in multiple states, in some examples: (1) as a special kind of volume clone in VDFS, where they can be mounted, modified, cloned, and exported as regular files, and (2) as a regular file that can be transferred to other VDFS clusters, or to third-party storage systems.

When an exo-clone exists as a volume in VDFS, in one embodiment, the whole exo-clone has a reference count, and is read-only. Initially, a VDFS cluster has no exo-clones, and may have one or more volume clones and snapshots. An exo-clone is created by first making a clone of an existing volume snapshot or exo-clone. At any point, a volume clone can be marked as an exo-clone, at which point it is either the first exo-clone in its lineage (analogous to an initial git commit) or it was created by cloning an existing exo-clone, or merging multiple exo-clones. If it was created from one or more exo-clones, then its parent UUIDs are the content UUIDs of those exo-clones. Next the exo-clone is given a reference count of one (it refers to itself), it becomes read-only, and finally all of the exo-clones referred to by its parent UUIDs have their reference counts increased.

The content UUID of an exo-clone is analogous to a hash of the exo-clone's content, but no hashing need be performed. This is because the UUID of an exo-clone, in one embodiment, is guaranteed to not be used until it is marked read-only and cannot be modified. In one embodiment, check-summing by the underlying storage layer (e.g., VSAN) provides reasonable safeguards against unintended corruption.

FIG. 1 is an example block diagram of an exo-clone file format 1000. The exo-clone file format 100 includes, in some embodiments, a header section 1002, a metadata section 1004, and a data (or payload) section 1006. Other embodiments may include additional or alternative sections. Thus, all embodiments are not limited to the specific sections 1002-1006 depicted in FIG. 1.

In one embodiment, an exo-clone volume is converted into an exo-clone file. In some embodiments, the exo-clone file format 100 includes the following data elements:

Parent UUIDs: lists all the other exo-clones that are immediate parents to this exo-clone.

Dedup UUIDs: lists other clones (not necessarily exo-clones) that this exo-clone refers to, to avoid storing file content already known to be present in other clones.

Metadata: contains a serialized file system tree which represents the added and deleted file system metadata, such as created files, deleted directories, modified files, etc.

Data: all new file data are stored in this section (e.g., portion, field, etc.), and are pointed by the file system tree in the metadata. For example, 4K data blocks can either be uncompressed or individually compressed, as shown by the uneven block size of the exo-clone file format 100. The block-based compression allows zero-copy merge of exo-clones where the compressed blocks can be directly pointed by file system metadata without being decompressed first. Arrows 1010 and 1020 in FIG. 1 also show that when data are deduplicated, multiple metadata can point to the same data extent.

Commit Metadata: this section contains some descriptive information easily parsed by user-level tools that cannot mount the exo-clone directly.

Content UUID: the UUID that represents the state of the content of the exo-clone. The content UUID is assigned to an exo-clone file after it is "committed," i.e., its content no longer changes. This UUID can be used to uniquely represent the content of the exo-clone file.

When an exo-clone file is first created, the exo-clone's file system tree in the metadata section 1004 may be encoded (e.g., using FlatBuffers, Protocol Buffers, JavaScript Object Notation, or the like) into the data (payload) section 1006 of the exo-clone file format 1000. In some embodiments, only the block ranges that were modified via the created exo-clone are cloned into the data (payload) section 1006, thereby alleviating the need of conventional systems to copy an entire image of a cluster that has been changed and consequently reducing the amount of data needing to be transmitted and analyzed by machines in order to propagate data changes. By cloning the blocks rather than copying them, the disclosed embodiments avoid the need for writing the vast majority of the content of the file; so creating these files in VDFS is very efficient and consumes only space to hold metadata.

Figure 2:
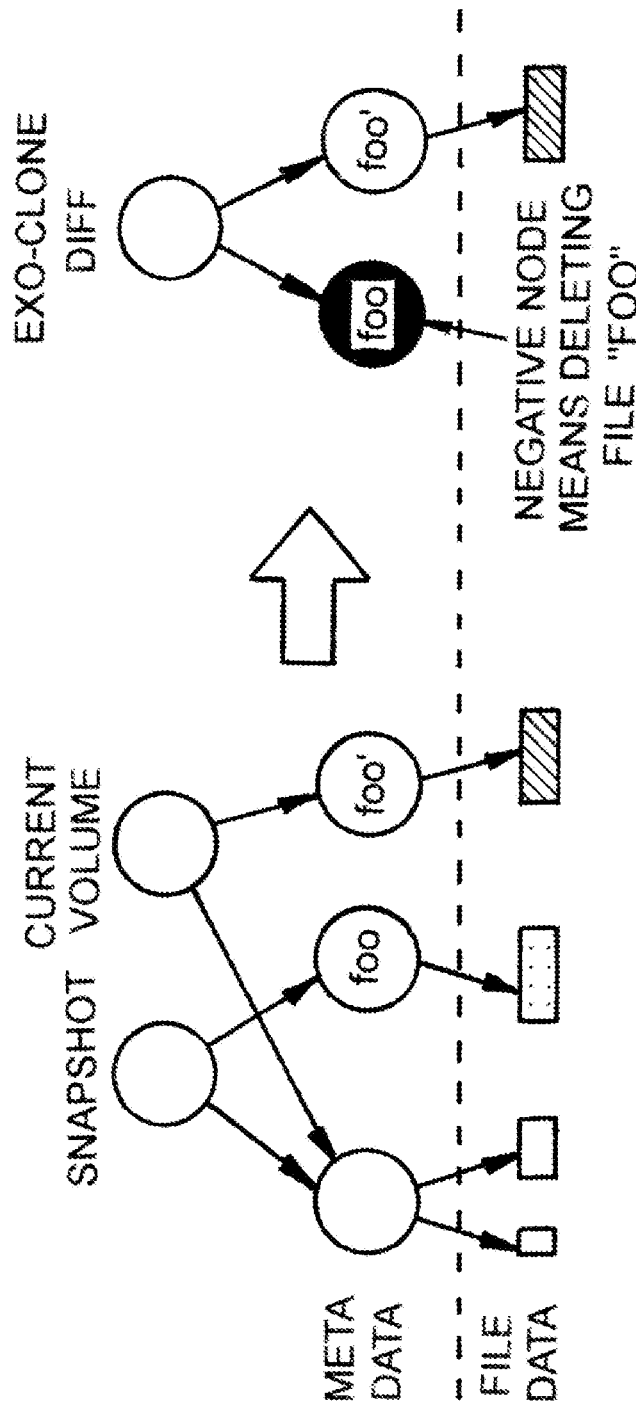
FIG. 2 is an example block diagram of a sequence for comparing B-trees to obtain exo-clone snapshots.

It is important to not scan the entire exo-clone volume to produce the exo-clone file. Because VDFS uses a COW B-tree to represent a volume and clones the B-tree when creating a new snapshot, it is easy to find out what data and metadata has been changed relative to the parent UUID by comparing two B-trees, as shown in FIG. 2. A particular example of an N-way merge is described herein, but the disclosure is not limited to these examples.

An example set of operations for creating an exo-clone includes the following. A snapshot is created of the volume (e.g., of a cluster) that needs an exo-clone. To do so, some embodiments perform the following: create a snapshot on the volume that needs an exo-clone, create an empty exo-clone file, add the UUID of the parent exo-clone file to the empty exo-clone file, add a new UUID specific to the newly created exo-clone file, and compare the metadata of the volume with that of the parent volume where the parent exo-clone file was created by performing the following operations:

```
If (it is a new file or new data blocks in existing file) {
    Adjust meta data of exo-clone file to point to the new file content (this
achieves zero-copy);
    Increase reference count of the file data added to the exo-clone file;
    Insert a command item to describe the file data write which points to
the file data in the exo-clone file;
} else {
    Insert a command item describing the metadata operation (delete file,
create directory, modify extended attributes, etc.);
}
```

In other embodiments, the exo-clone file may be rescanned so that data can be deduplicated against previous exo-clone files. Some embodiments do so by: filling in the UUIDs of the exo-clone files where deduplication will happen against, scanning the blocks of the previous exo-clone files, and creating a dictionary of ContentHashOfBlocks pointing to the address of data blocks in a previous (e.g., older) exo-clone file. Then, for each block in the current exo-clone file: a content hash is calculated, and the following operations are performed:

```
if (hash exists in the dictionary) {
    Unmap the data block (to reclaim space);
    Adjust data pointer to point to old address;
} else {
    Add this content hash and block address pair into the dictionary;
}
```

Optionally, the size of exo-clone file may be further reduced by applying compression to each block (the zero-copy property is lost though in these examples):

For each exo-clone data block (e.g., 4K) of the exo-clone file:

```
If (block can be compressed to a smaller size) {
    Compress the block and write it to a free space;
    Unmap the original block (to reclaim space);
    Let exo-clone point to the compressed block;
    Increase the reference count of the compressed block;
}
```

An exo-clone may be copied outside of the original VDFS instance and used by another VDFS cluster, or in a third-party storage system. As described herein, the exo-clone file format 100 may include Dedup UUIDs. This section is optional, but if used, it can dramatically reduce the size of exo-clone files so they can be efficiently transmitted over the network.

When creating an exo-clone file, the user or a software program can choose to deduplicate the exo-clone to make the resulting file as small as possible for transmission. When deduplicating an exo-clone, VDFS selects some number of other exo-clones that they believe the receiving party also has, and VDFS rewrites the exo-clone such that it refers to the data in the other exo-clones. All exo-clones that become dependencies in this way are listed in the Dedup UUIDs section of the file format.

Even though exo-clones in VDFS exist as volumes with uncompressed block data consuming storage capacity, they can be compressed (e.g., with a tool like gzip) just like tar archives, before they are stored in a third-party storage system, e.g., for incremental backup. In this use-case, the information in the Parent, Dedup, and Content UUID sections allow customers and operators to write simple programs to ensure all dependencies are present for an exo-clone, while simultaneously reaping the benefits of deduplication, without having to understand the VDFS file system format.

Mounting exo-clones in VDFS avoids decoding and deserialization of the vast majority of the exo-clone file data. This is referred to as a "zero-copy mount." In some embodiments, mounting follows three steps or operations: (1) verify mounting is possible, (2) read in exo-clone file metadata into the VDFS cache, and finally (3) increment the reference counts of all file data blocks referred to by the exo-clone. For step one, all exo-clones listed in the Parent UUIDs and Dedup UUIDs sections are checked to determine whether they are present. For step two, because the metadata section 104 is encoded in a format like FlatBuffers (analogous to just storing in-memory structs or objects), the metadata section 104 can be memory-mapped directly into VDFS's cache. For step three, walk the file system tree of the exo-clone and increase the reference count of all file extents referred to by the tree.

In some embodiments, N-way merge of two or more exo-clones is accomplished by creating a volume clone of one of the exo-clones called the "merge clone," and then cloning all the files from the parent exo-clones into the merge clone. Alternatively or additionally, if a directory tree only exists in the exo-clone but does not exist in the merge clone, a more efficient method can be used than iterating and cloning all files from the parent exo-clones. In this alternative method, the parent exo-clones are first cloned (called ClonedParentExoClones), and for each directory tree in the ClonedParentExoClones, a symlink or directory hardlink, or directory clone can be created in the merge clone to point to this directory tree. In cases where files in two or more exo-clones were modified, all three files are cloned into the merge with a unique suffix. Once merging completes, the merge clone is modifiable to resolve conflicts (e.g., by removing all but one of the conflicting files with the same prefixes). At any point the merge clone can be set read-only and made into an exo-clone, at which point it is assigned a content UUID, and its parent UUIDs are made the UUIDs of the exo-clones that were merged. This process is analogous to how source control systems handle N-way merge: the user commits when they are done resolving conflicts. To make merging efficient, files are cloned, rather than copied, into the merge clone during N-way merge.

Figure 3:
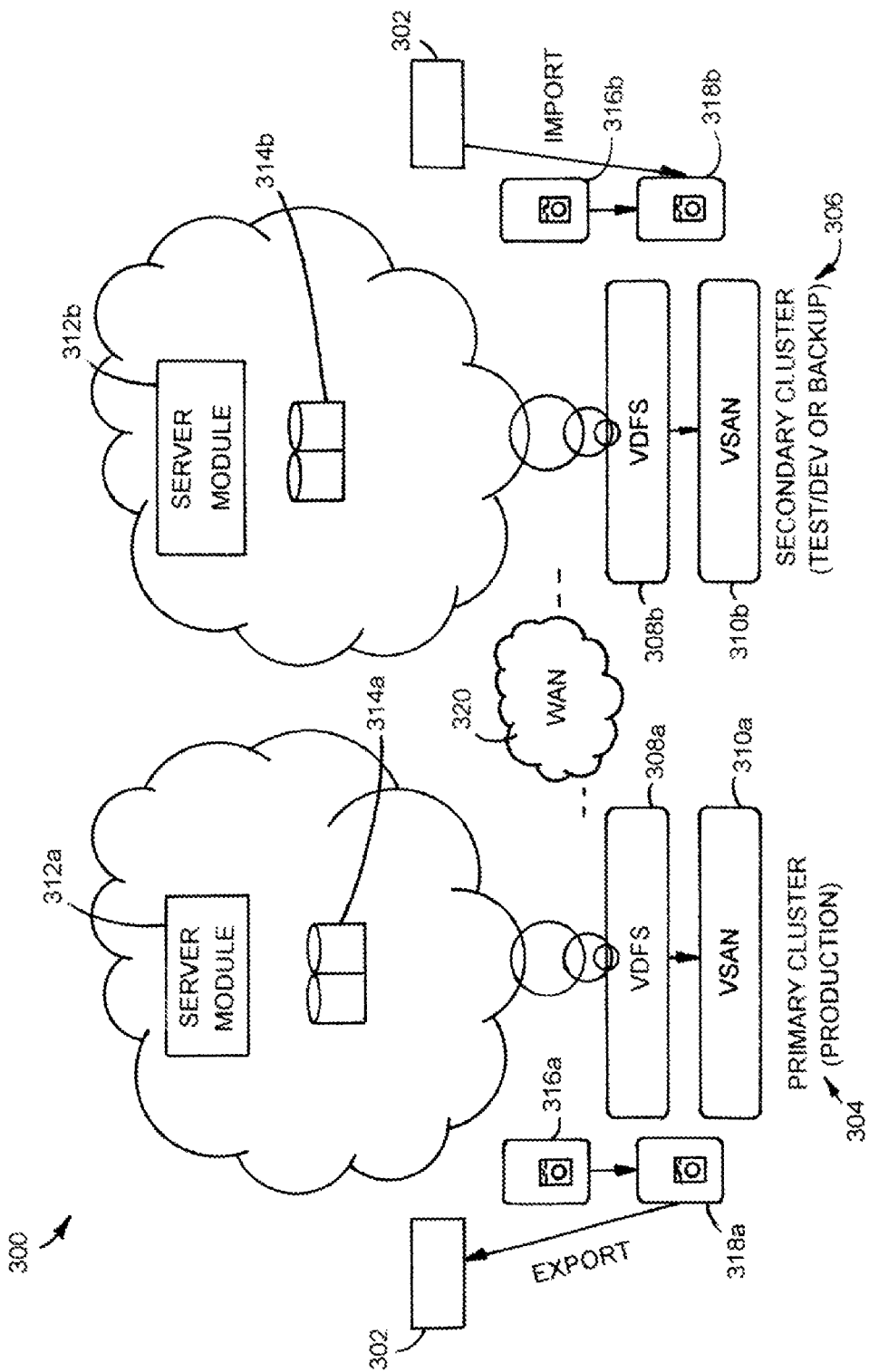
FIG. 3 is an example block diagram of a networking environment for implementing exo-clones to update clusters.

FIG. 3 is an example block diagram of a networking environment 300 for implementing an exo-clone file 302 to propagate storage from a primary cluster 304 of machines (real or virtual) to a secondary cluster 306 of machines (real or virtual). The illustrated example specifically shows the exo-clone file 302 being created from snapshots 316a-318a of a production node being implemented on the primary cluster 304 and propagated to a test/development node on the secondary cluster 306. The primary and secondary clusters include mirror server modules 312a,b that operate as web or virtual server software for managing distributed databases 314a,b on in the respective clusters. In one particular example, the server modules 312a,b implemented as Apache HTTP Server software, and the distributed databases 314a,b are implemented as Apache Cassandra software that manages the databases being cloned and updated. The primary cluster 304 operates a VDFS 308a in a VSAN 310a. Likewise, the secondary cluster 304 operates a VDFS 308b in a VSAN 310b.

The primary cluster 304 and secondary cluster 306 are in communication across a network, shown as a wide area network (WAN) 320. WANs, and other similar types of networks. The exo-clone file 302 may be compressed before being communicated to the secondary cluster 306 over the WAN 320.

In some embodiments, VDFS 308a,b are scale-out distributed file systems for web-scale applications. Conventionally, software applications running in a cloud environment are composed of multiple applications that are essentially complex distributed databases or key-value stores, such as in Apache Cassandra or Kafka. At the same time these applications also incorporate traditional stateful applications like MySQL or Apache web server. VDFS 308a,b are distributed FS layers that, in some embodiments, take snapshots of the distributed databases 314a,b; share changes as exo-clone files 302 between the two clusters 304 and 306; and provide the most consistent crash-consistent snapshots 316-318 for small- and large-scale distributed applications.

In operation, the primary cluster 304 supports an application that updates the distributed database 314a with an incoming request. The server module 312a takes a snapshot 316a of the distributed database 314a. When performing a diff operation, the server module 312a of the primary cluster 304 may refer to other snapshots 318a in the file system as well (not just snapshot 316a). A diff operation is performed as part of this snapshot comparison operation, and the block diff values of the snapshot 316a is included in the exo-clone file 300, along with a UUID of the distributed database 314a operating in the primary cluster 304. When performing a diff operation, the server module 312a of the primary cluster 304 may refer to other snapshots 318a in the file system as well (not just snapshot 316a).

Additionally, in some examples, state information may also be included. The state information is needed in order to import the exo-clone file on the receiving system. The state information may include the UUID of the exo-clone file, the parent UUIDs and/or dedup UUIDs at the time the exo-clone file was generated, or a combination thereof. By only transmitting the exo-clone file 302 that includes just the differences of the snapshot(s) 316a (and 318a), computer and bandwidth resources are not wasted on capturing and communicating entire images of the distributed database 314a on the primary cluster 304 to propagate changes to the distributed database 314b on the secondary cluster 306.

In some embodiments, the server module 312a creates a zero-copy exo-clone file 302 on the primary cluster 304. To do so, some embodiments create a fake file that points at the blocks in the distributed database 314a that were changed, specifically referring to the data (or blocks of data) that was changed, without making a copy. This zero-copy exo-clone file 302 is then exported to the secondary cluster 306. The server module 312b of the secondary cluster 306 imports the zero-copy exo-clone file 302 and constructs the snapshot 318b by comparing two volumes of the distributed database 314b (e.g., through comparison to snapshot 316b) using reference counts.

Once the exo-clone file 302 is received, the server module 312b of the secondary cluster 306, in turn, assesses the block diff information in the exo-clone file 302 against the snapshot 318b of the distributed database 314b. In one embodiment, the snapshot 318b is a copy of a snapshot 316b taken of the distributed database 314b, and the diff block information in the exo-file 302 indicates which files to update in order to reflect the changes identified in the distributed database 314a of the primary cluster 304. Also, by having the UUID of the distributed database 314a of the primary cluster, the secondary cluster 306 can identify the distributed database 314a at which the changes have exist. In short, knowing the changes and the identity of the database of those changes provides some of the disclosed embodiments with all the information needed to propagate the changes to distributed database 314b in the secondary cluster 306.

A user control program (referred to herein as a "broker") may be included on the primary and secondary sides communicating a list out all the snapshots on each side. This allows the primary cluster 304 to deduplicate before sending the exo-clone file 302. To do so, a table of UUIDs of prior exo-clone files 302 may be maintained. The broker is not the file system, but instead is a daemon that communicates with the file system and other brokers. Thus, brokers may be included in all clusters to coordinate the exo-clone files 302. The broker on the primary side may first get a list of all exo-clone files that are already on the secondary side, and the primary side can make a preflight run to find out whether the to-be-transmitted exo-clone file has any duplicated content that are already in the list of these exo-clone files. The broker on the primary side may dedup the exo-clone file against a chosen set of exo-clone files from the list of exo-clone files and generate a new smaller exo-clone file that lists the UUIDs of the chosen exo-clone files as dedup UUIDs. When the secondary side of the broker gets the smaller exo-clone file, the secondary side may get all data needed by consulting the dedup UUIDs. This reduces the amount of space that must be transmitted over network.

Also, it should be noted that the disclosed embodiments propagate the changes to the distributed database 314 from a production mode to a test/development environment. The exo-clone file 302 may be opened by any file system. For example, the exo-clone file 302 may be created in a first file system and applied to a second file system (e.g., the source patch is applied to the receiving source tree). This is referred to as "rebasing." Different bases (e.g., different file system versions) may be used on the primary and secondary clusters, and the software on the secondary cluster 306 knows how to interpret and apply the exo-clone file 302 from the primary cluster 304, even though the sending and receiving source trees may be different.

In one embodiment, the VDFS 308b of the secondary cluster 306 deduplicates the exo-clone file 302 relative to other exo-clone files received or known by the secondary cluster, e.g., as indicated in the UUIDs of the previously received exo-clone files. Along these lines, the server module 312b of the secondary cluster 306 rewrites the payload of the exo-clone file 302 to reflect the other received or known exo-clone files and updates a corresponding deduplicated UUID of the exo-clone file 302 to reflect these other exo-clone files.

In some embodiments, differences to the distributed database volumes may be captured by multiple diff operations performed on snapshots at different times. For example, a first exo-clone file may capture differences to a first group of block chains at a first time (T), and a second exo-clone file may capture differences to a second group of block chains at a later time (T+n). These differences from both exo-clone files may be merged into a single "merged exo-clone file," and then transmitted (or compressed and transmitted) to a secondary cluster for implementing the changes to the volume.

In some embodiments, the exo-clone file 302 is saved in cache memory on the secondary cluster 306. The secondary cluster 306 reads (or memory maps) in the file or volume metadata of the exo-clone file 302 into cache memory of the secondary cluster 306. This may be done, in some examples, by the server module 312b just pointing to the blocks of data of the volume of a distributed application that are already on the secondary cluster 306, which are shared in the snapshots 316b and/or 318b.

Conventional Docker containers limit the number of layers to 127, and although the number can be increased, it is finite and kept relatively small on purpose as each layer consumes an another union file system (AUFS) mount point in the kernel. Docker containers need to maintain a Union file system (FS) mount for each layer, where each layer is analogous to a single git commit. This imposes a severe limitation on how powerful container layer composition can be. Conversely, exo-clones may include a chain of snapshots, and the composition of all the layers, or exo-clones, may include the most recent exo-clone in the chain. As a result, there is no need to union all layers. VDFS with exo-clones does merge though, but only when the chain of exo-clones diverged, and conflicting changes based on the same parent exo-clone must be resolved. So merging is a much rarer event, and once it is complete, a single exo-clone is left, and there is no need to ever mount more than the most recent exo-clone (the highest layer).

Some examples of N-way merge include using file clone, directory symlink, and/or directory clone. Exemplary operations are shown below, for all three of these examples:

Download exo-clone file into a VDFS volume;
Make a clone of the volume where the exo-clone file will be applied (the exo-clone file will be mounted on the new cloned volume);
For each command item in the exo-clone file:

```
Apply the change in the command item;
If (the command item is a file write) {
    Point file data to the blocks in exo-clone (this achieves zero-copy);
    Increase the reference count of the data blocks in the file write;
}
```

Exo-clones may use variable-length deduplication to make over-the-WAN migrations from public to private cloud or backups efficient and fast. Docker cannot manage the complexity as easily as a distributed file system namespace like VDFS. Docker also lacks a way to efficiently compute and catalog variable-length content hashes as data is read and written, a task typically performed by the file system. Exo-clones, as a feature of VDFS, provide deduplication and manage exo-clone deduplication dependencies.

Rather than looking at how customers deploy installation images, in one scenario, a customer may already be running a stateful application in a container, but the customer may want to move the contents of the container from production in a public cloud to on-premises. An example is a VDI application with a home directory that needs to be deployed to a different environment, another may be making a copy of an active server in production to use in testing a new application on-premises. In both cases, exo-clones in VDFS treat active volumes and images the exact same way and both can be transmitted from on-premises to public or elsewhere using the exact same means for transmitting container images. Docker distinguishes between container images and instances, where the latter cannot currently be migrated. VDFS mounts the exo-clone and rapidly takes a consistent snapshot of it, even while it is in use, as VDFS is the file system the application is running on top of, rather than a user-level tool reading and writing into a directory like Docker or tools like git.

Users of VDFS can backup volume snapshots as exo-clones that are copied off-site. This provides the same kind of incremental backup provided by SnapVault, except that SnapVault provides a way of searching through backed up content. On the other hand, VDFS exo-clones are regular files that can be stored in any 3rd party storage system (e.g., S3, a NAS, etc.), giving users control of where to store their backup.

Containers fail to provide a file format that fully encapsulates an application with all of its dependencies, whether it is running or not, across multiple operating systems. Docker currently does not support how existing, stateful applications would work when they must "carry" their state with them during migration from one mode to another, as it differentiates between container images and instances, where the latter is not represented as a small regular file that can be migrated as easily as images. Customers cannot maintain revisions made to suites of tools (tool sets) over time, when an application is composed of many layers, with existing systems. Existing systems also do not allow customers to efficiently deploy containers between different environments, or make and deploy changes rapidly, as container images must be essentially resent for minor modifications.

VDFS with exo-clones outlines one solution to these problems that exploits a common storage infrastructure at the file system interface with a native export file format and intrinsic support for policies and service guarantees for different applications that stick with the application no matter where it is migrated or backed up to. Many of the disclosed techniques involve directly handling the file system requests of applications (e.g., avoiding content hashing of all exo-clones, efficiently constructing exo-clone files, and constructing highly deduplicated and compact exo-clones). Exo-clone support for sticky policies uses an underlying distributed storage area network to provide availability, performance, and intelligent management of storage policy.

VDFS with exo-clones provides a complete storage solution for customers that want to run both their existing applications, and new applications, with the same container image format, policy language, backup system, and volume management.

Exo-clones allow a storage operator (e.g., an IT specialist administrating a shared storage service) to manage changes to the storage service using source control metaphors. With exo-clones, IT personnel can migrate a change to a file system to another storage cluster by copying an exo-clone file to that cluster and applying it. Below is a non-exhaustive list of exemplary source control metaphors and how their exo-clone analogues behave and allow IT personnel operating a shared storage service to easily manage changes to storage across multiple clusters or environments:

1. "git log"
   1. In a source control system like git, list a log of each change made to the source control system along with a unique ID that can be used to check out a writable clone of that change.
   2. In VDFS with exo-clones, one can list all the ancestors of an exo-clone, including provenance information about where each exo-clone came from. Each exo-clone includes a UUID that can be used to make a writable clone of the exo-clone. Unlike with source control systems, the writable clone is created instantly, even for very large file systems.
2. "git checkout"
   1. In a source control system like git, one can check out the current or any previous commit in the log and then make changes to that checkout, then commit those changes to a new branch.
   2. In VDFS with exo-clones, one can make a writable clone of any existing exo-clone (including that eco-clone's ancestors which are also exo-clones) and modify it. When done, a new exo-clone that becomes a descendent of the exo-clone one originally cloned may be created, just like a new commit in a new branch.
3. "git branch"
   1. In a source control system like git, one can branch any commit in the log and attach a chain of new commits to that branching point.
   2. In VDFS with exo-clones, one can make a clone of any existing exo-clone, and attach a chain of new exo-clones to that branching point.
4. "git add/rm"
   1. In a source control system like git, one can add or remove files in the working directory from the current commit.
   2. In VDFS with exo-clones, all files are automatically included in the commit without any manual interaction required by the user. Users can also manually exclude some files from the exo-clone without having to delete them though, to reflect the same capability as one would have with a system like git.
5. "git commit"
   1. In a source control system like git, one can commit your changes and store a snapshot of those changes as another link in a list of commits.
   2. In VDFS with exo-clones, one can create a new exo-clone of the current volume one are modifying at any time, attaching that exo-clone to the exo-clone from which the volume one are modifying was derived or "checked out" from.
6. "git push"
   1. In a source control system like git, one can push commits from one computer to another, such that it can reconstruct those commits as long as it has all the ancestors of those commits in its chain of commits.
   2. In VDFS with exo-clones, one can create an exo-clone regular file, which can be copied alone, or with other exo-clones, to another environment, where it can be applied as long as its ancestors are present, to reconstruct the exact same snapshot on the remote environment/VDFS instance.
   3. Furthermore, in VDFS with exo-clones, one can create an exo-clone which is deduplicated against other exo-clones, volumes, or snapshots that are not ancestors or direct parents to shrink the size of the exo-clone.
7. "git fetch"
   1. In a source control system like git, where a branch is a series of commits, and where one has the first N of those commits, but perhaps not all of them, one can request a remote computer to send the remaining commits one do not have so that one can subsequently apply them to your local branch.
   2. In VDFS with exo-clones, one can ask a remote VDFS instance to send one the exo-clones that one do not have for one or more branches.
   3. Furthermore, one can specify a list of exo-clone UUIDs that one have so that the remote VDFS instance can deduplicate the exo-clones it sends to one as much as possible to minimize them as much as possible.
8. "git pull/merge"
   1. In a source control system like git, once one have downloaded commits for some branch one can apply them to advance the branch. If your branch has diverged, in other words, one has committed some new commits locally that conflict with the commits from the remote computer that one wants to apply, git creates a merge commit that merges the most recent of your local commits with the most recent of the remote commits.
   2. In VDFS conflicting exo-clones can be resolved with a merge as well. In cases where a file or directory is present locally but not remotely, or vice versa, the merged commit shows both being present. In cases where the same files are modified, copies of both files are presented, and the user is free to remove or merge them as they see fit, and then create an exo-clone when they are done, thus creating the merge commit, (e.g., resolving conflicts in a merge). Alternative merge strategies can also be employed, such as automatically resolving conflicts by using 3rd party plugins where the appropriate plugin is chosen based on the file type, by scanning portions or all of the files to be merged, or by simple strategies including "always prefer the local version" or "always prefer the remote version" or "always prefer the most recently modified version", etc.
9. "git rebase"
   1. In a source control system like git, commits that are not descendants of the commits they are being applied to can still be applied by performing what is known as a rebase. The two branches are called the base and the rebased branch. Git iterates backward through the most recent commits of both branches until it finds the last common commit, which is the last commit before the branches diverged, then it takes all the subsequent commits from that point in the rebased branch and applies them in order from first to last to the most recent commit of the base branch. The commits to be applied are applied in order, from first to last, and each commit must apply without conflicts, if it incurs conflicts, the merge resolution process from the "git pull/merge" item is employed. After the commit is applied, the next commit is applied, until all of them are applied. Often there are no conflicts, and the rebase executes entirely automatically. Rebases are useful, for example, for porting useful changes to one source base to a similar but slightly different source base, e.g., two different releases of the same kernel that must receive the same security fixes so customers running both the older and newer kernels are protected.
2. In VDFS, one or more exo-clones can be rebased onto a branch of exo-clones as well. The rebased exo-clone has all directories and files that are present in the rebased exo-clone but not the base or target exo-clone transferred over by one of potentially several means:
   1. The file or directory is copied over
   2. The file or directory is cloned over, using VDFS file clone, or VDFS directory clone
   3. The file or directory is symlinked over
   4. The file or directory is hard linked over 10. "git cherry-pick"
    1. In a source control system like git, commits that are descendent of other branches can be rebased onto the current branch. This is a specialized version of rebase where the commits to be rebased are not inferred by an algorithm that iterates backward to find the point of divergence, but rather the user manually specifies the list of commits, from first to last, to be applied to the current branch.
    2. In VDFS, exo-clones can also be applied to other branches by name, and a list of names can be supplied as well where the first name is the first exo-clone applied, the second is the second exo-clone applied, and so on, just as with git cherry-pick.
11. "fast forward"
    1. In a source control system like git, when commits are direct descendants from a branch, they can be applied with a guarantee that there were no conflicts, as the descendent commits list the parent by commit ID, thus guaranteeing the commit is compatible.
    2. In VDFS, exo-clones can also be applied with a guarantee of compatibility as each exo-clone lists the UUID of its parents, and if the commit is applied to its parents, the guarantee is met and the user is notified the commit was a fast forward. Furthermore VDFS can fast forward more efficiently than a rebase or merge as file system meta data is encoded using VDFS's logical logging format and can be replayed directly on top of a clone of the parent exo-clone in the same fashion as performing a file system recovery, which is much more efficient than performing a series of file clones, renames, or copies, as it avoids performing directory tree walks and lookups for each file applied and merely inserts the file meta data directly into the B-Tree.

Figure 4:
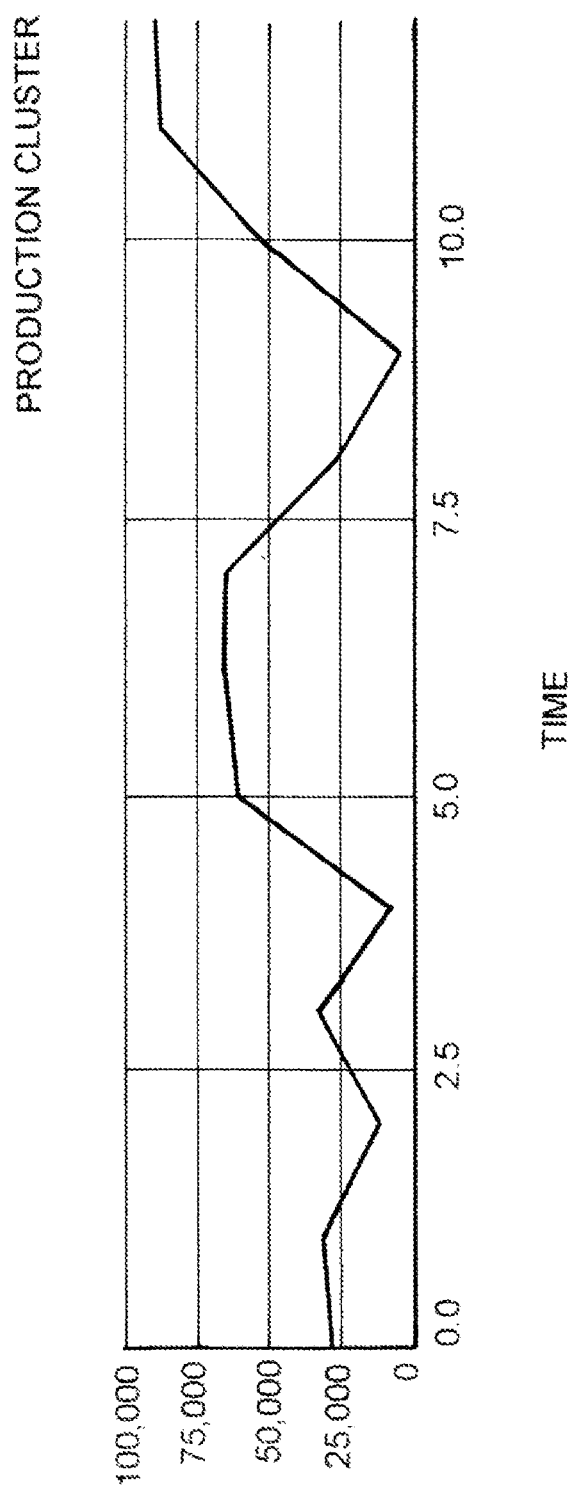
FIG. 4 is an example graph diagram illustrating insert throughput of a production cluster.
Figure 5:
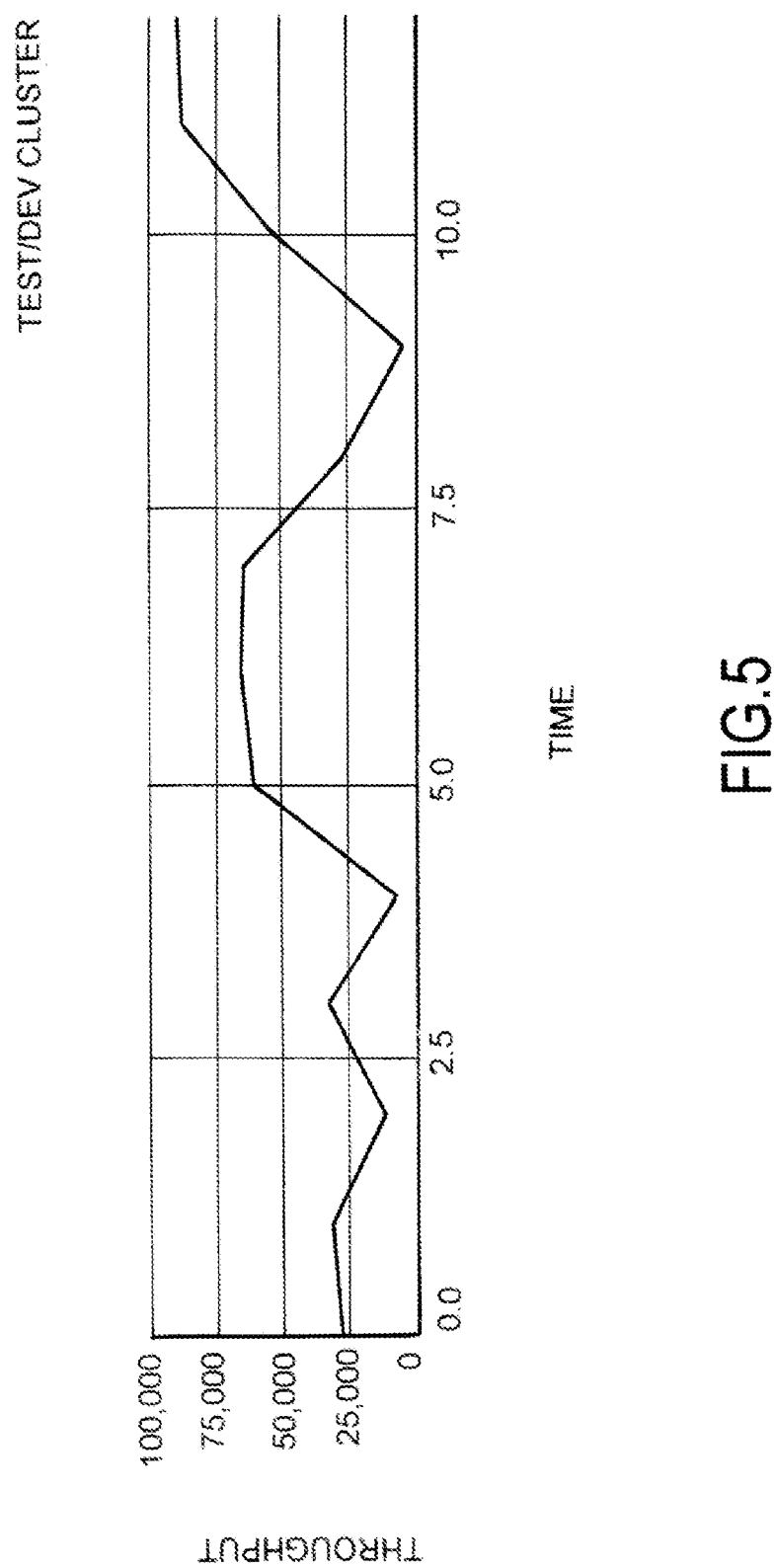
FIG. 5 is an example graph diagram illustrating insert throughput of a secondary cluster.

FIGS. 4 and 5 are graph diagrams illustrating actual measured performance of propagating data changes to distributed databases using exo-clone files 302. These Figures show actual experienced throughput of inserts (per/second) experienced on a production cluster (FIG. 4) and a test/development cluster (FIG. 5). In some examples, the depicted graphs of FIGS. 4 and 5 are presented in user interfaces to users on client computing devices. For example, an administrative user of an application being hosted on primary and secondary clusters may access the depicted graphs of FIGS. 4 and 5 on a laptop computer, tablet, smart phone, or the like to quickly understand how the speed and throughput associated with changes being migrated from the primary cluster to the secondary cluster.

Figure 6:
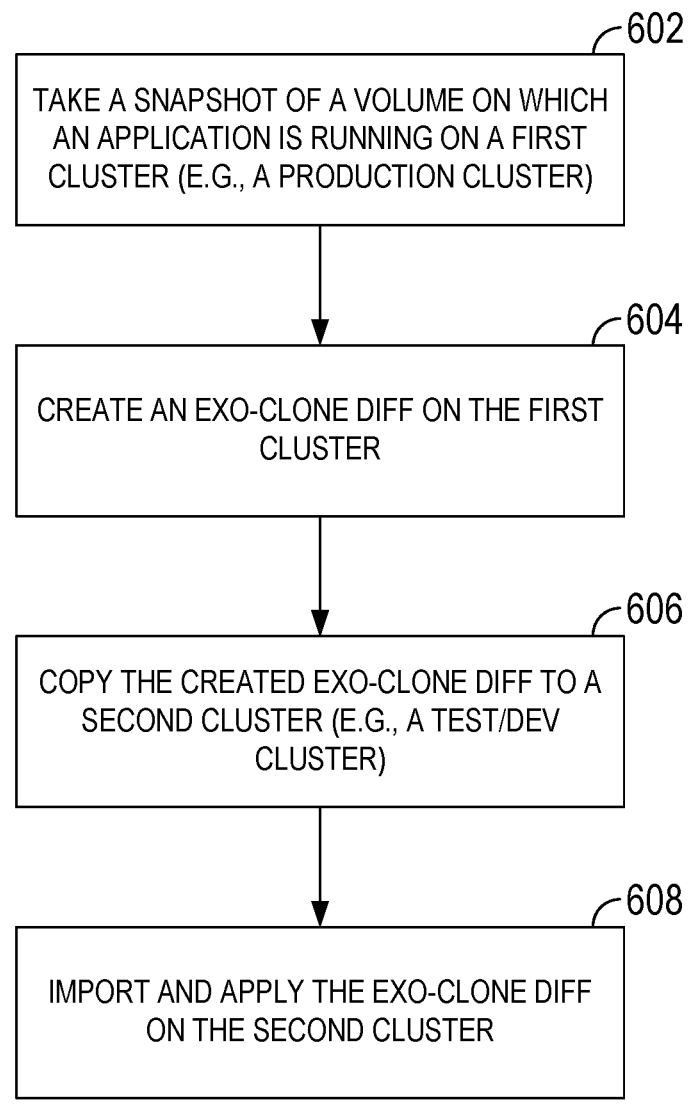
FIG. 6 is a flowchart of an exemplary method for migrating a distributed application across two distinct infrastructures.

FIG. 6 is a flowchart of an exemplary method performed to migrate a distributed application across two distinct infrastructures. A snapshot is taken of a volume on which an application is running on a first cluster (e.g., a production cluster), as shown at 602. An exo-clone diff is created on the first cluster, as shown at 604. The created exo-clone diff is copied to a second cluster (e.g., a test/dev cluster), as shown at 606. The exo-clone diff is imported and applied on the second cluster, as shown at 608. Other embodiments may perform these operations out the illustrated sequence, or may include alternative operations as well.

Figure 7:
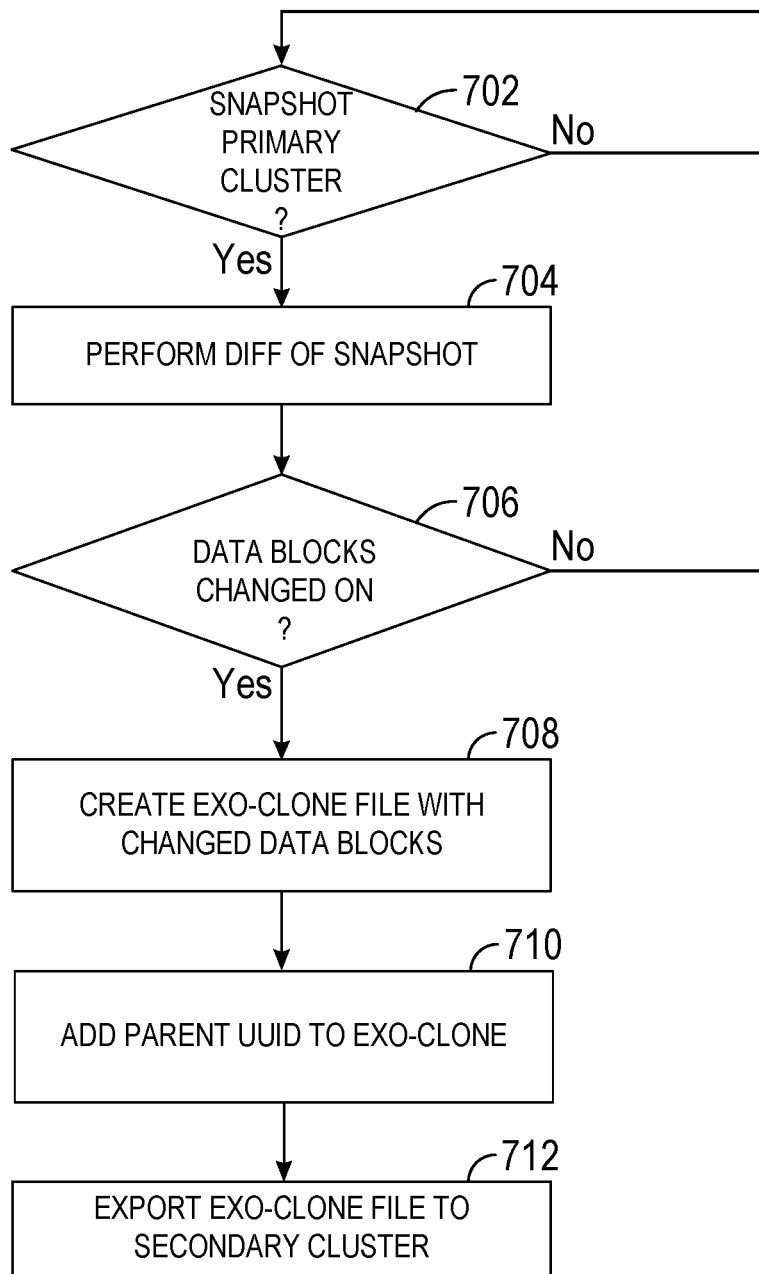
FIG. 7 is a flowchart of an exemplary method performed to create and export an exo-clone file from a primary cluster.

FIG. 7 is a flowchart of an exemplary method performed to create and export an exo-clone file from a primary cluster. A server module on a primary cluster is configured to create a snapshot of an application's volume, either periodically conditionally based on an event, as shown at decision block 702. Once the snapshot is created, the server module performs a diff operation of the snapshot a previous snapshot of the volume, as shown at 704. If the volume has changed, this diff operation identifies the data blocks that have changed, and their new data values. As shown by decision block, 706, if nothing has changed, the server module waits for another snapshot to be created. On the other hand, if data has changed, the server module creates an exo-clone file, as shown at block 708, that includes (data-wise) only the changed data blocks and their new data values. Additionally, in some examples, the server module may add the parent UUID, as well as any of the other identifiers, metadata, or state information, to the exo-clone file, as shown at 710. More specifically, the UUID may identify the parent storage device or cluster that is hosting or otherwise managing the data blocks that were changed. The exo-clone file may then be exported to a secondary cluster, as shown at 712.

Figure 8:
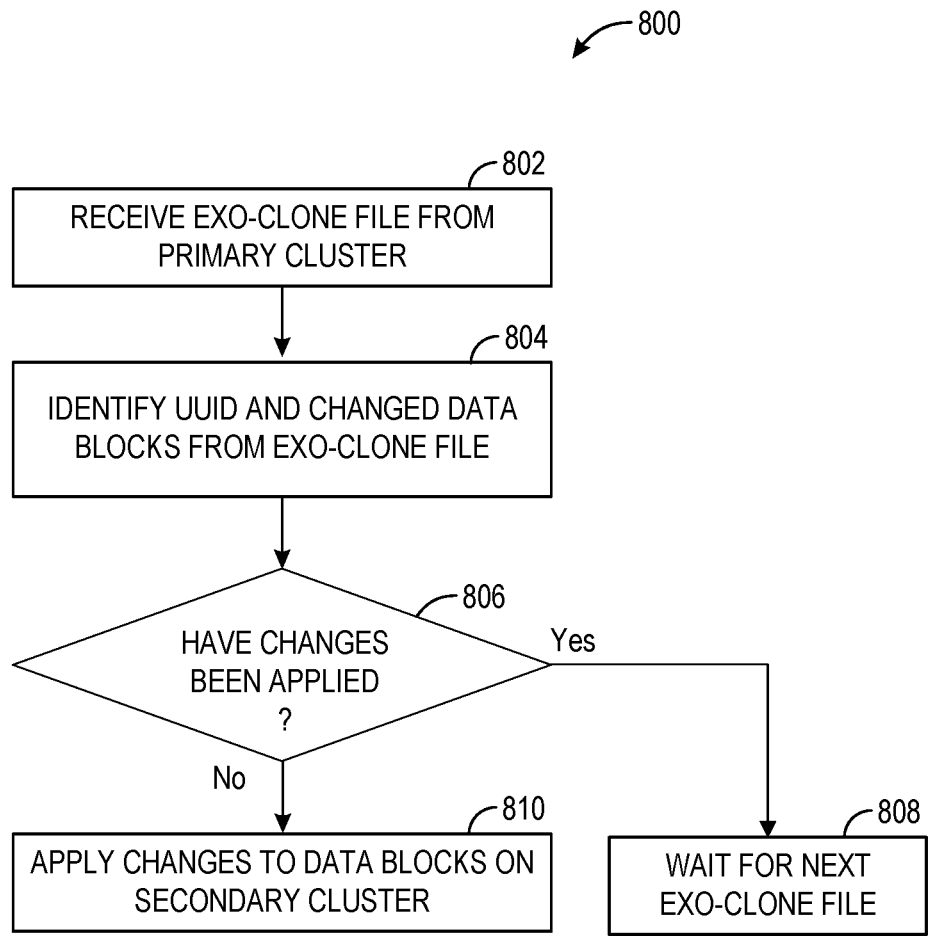
FIG. 8 is a flowchart of an exemplary method performed to import an exo-clone file from a primary cluster and apply the imported exo-clone file to a volume on a secondary cluster.

FIG. 8 is a flowchart of an exemplary method performed to import an exo-clone file from a primary cluster and apply the imported exo-clone file to a volume on a secondary cluster. At a secondary cluster, an exo-clone file is received from a primary cluster, as shown at 802. The exo-clone file includes chains of data blocks that have changed in a volume on the primary cluster, a parent UUID of the changed data blocks, and any of the metadata or state information disclosed herein. A server module on the secondary cluster identifies the UUID and changed data blocks in the exo-clone file, as shown at 804. The server module then checks to see whether these data changes have been applied to a version of the volume stored on the secondary cluster, as shown by decision block 806. If the changes have been applied, the process ends, and the server module of the secondary cluster waits for the next exo-clone file, as shown at 808. On the other hand, if the changes have not been applied, they are applied on the secondary cluster by the server module, meaning, in some embodiments, the identified data blocks are changed according to the changes in the exo-clone file, as shown at 810.

Exemplary Operating Environment

The disclosure is operable with any computing device, such as a host computing device 106. Host computing device 106 include a processor 108 and memory 110. The host computing devices 106 share access to multiple underlying storage devices 116. The underlying storage devices 116, in some examples, includes a synthetic block device 118, such as a virtual machine disk (VMDK) 120, a common internet file system (CIFS) 122, a network file system (NFS) 124, virtual hard drive (VHD) 126, or network-attached storage (NAS) 128.

Figure 9:
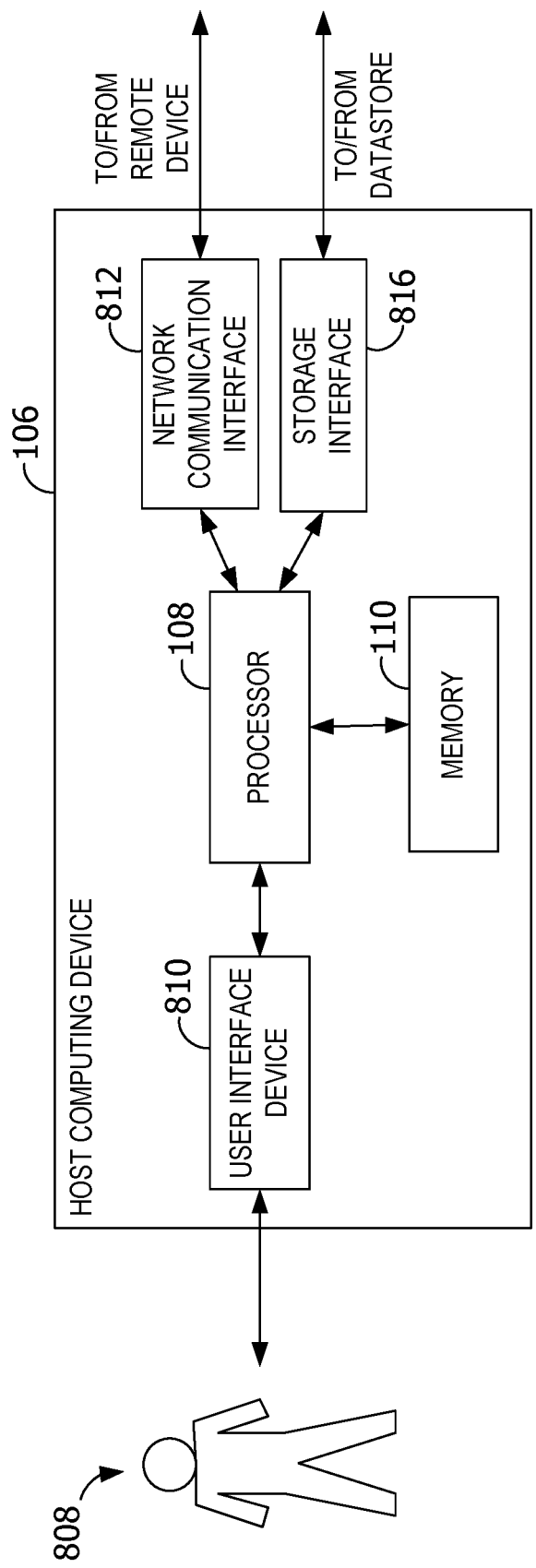
FIG. 9 is an example block diagram of a host computing device.

FIG. 9 is a block diagram of an example host computing device 106. Host computing device 106 includes a processor 108 for executing instructions. In some examples, executable instructions are stored in a memory 110. Memory 110 is any device allowing information, such as executable instructions and/or other data, to be stored and retrieved. For example, memory 110 may include one or more random access memory (RAM) modules, flash memory modules, hard disks, solid state disks, and/or optical disks.

Host computing device 106 may include a user interface device 810 for receiving data from a user 808 and/or for presenting data to user 808. User 808 may interact indirectly with host computing device 106 via another computing device such as a device running VMware's vCenter Server or other management device. User interface device 810 may include, for example, a keyboard, a pointing device, a mouse, a stylus, a touch sensitive panel (e.g., a touch pad or a touch screen), a gyroscope, an accelerometer, a position detector, and/or an audio input device. In some examples, user interface device 810 operates to receive data from user 808, while another device (e.g., a presentation device) operates to present data to user 808. In other examples, user interface device 810 has a single component, such as a touch screen, that functions to both output data to user 808 and receive data from user 808. In such examples, user interface device 810 operates as a presentation device for presenting information to user 808. In such examples, user interface device 810 represents any component capable of conveying information to user 808. For example, user interface device 810 may include, without limitation, a display device (e.g., a liquid crystal display (LCD), organic light emitting diode (OLED) display, or "electronic ink" display) and/or an audio output device (e.g., a speaker or headphones). In some examples, user interface device 810 includes an output adapter, such as a video adapter and/or an audio adapter. An output adapter is operatively coupled to processor 108 and configured to be operatively coupled to an output device, such as a display device or an audio output device.

Host computing device 106 also includes a network communication interface 812, which enables host computing device 106 to communicate with a remote device (e.g., another computing device) via a communication medium, such as a wired or wireless packet network. For example, host computing device 106 may transmit and/or receive data via network communication interface 812. User interface device 810 and/or network communication interface 812 may be referred to collectively as an input interface and may be configured to receive information from user 808.

Host computing device 106 further includes a storage interface 816 that enables host computing device 106 to communicate with one or more data storage devices, which store virtual disk images, software applications, and/or any other data suitable for use with the methods described herein. In example examples, storage interface 816 couples host computing device 106 to a storage area network (SAN) (e.g., a Fibre Channel network) and/or to a network-attached storage (NAS) system (e.g., via a packet network). The storage interface 816 may be integrated with network communication interface 812.

Figure 10:
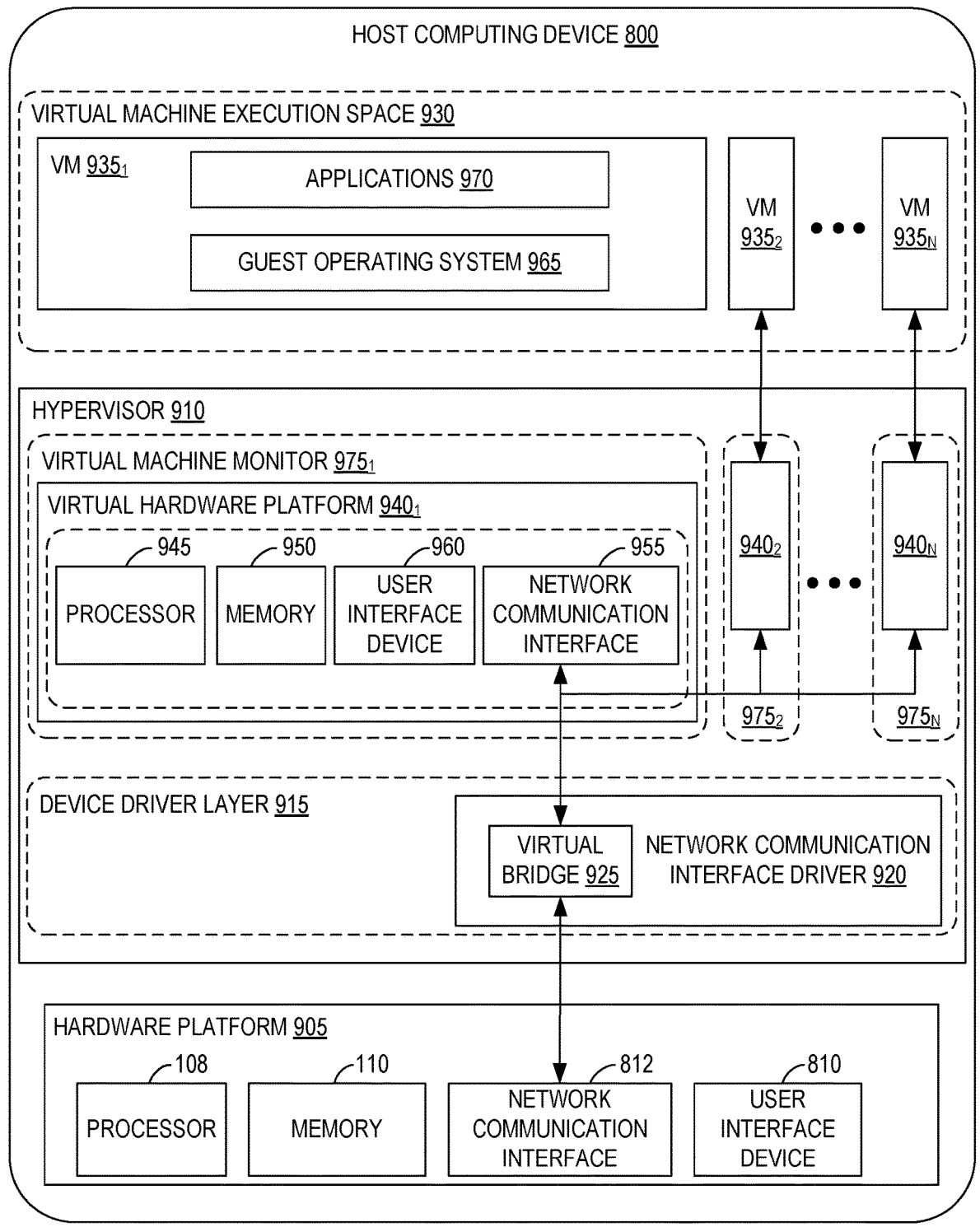
FIG. 10 is an example block diagram of virtual machines that are instantiated on a host computing device.

FIG. 10 depicts a block diagram of virtual machines $935_1$, $935_2$ ... $935_N$ that are instantiated on host computing device 106. Host computing device 106 includes a hardware platform 905, such as an x86 architecture platform. Hardware platform 905 may include processor 108, memory 110, network communication interface 812, user interface device 810, and other input/output (I/O) devices, such as a presentation device. A virtualization software layer, also referred to hereinafter as a hypervisor 910, is installed on top of hardware platform 905.

The virtualization software layer supports a virtual machine execution space 930 within which multiple virtual machines (VMs $935_1$-$935_N$) may be concurrently instantiated and executed. Hypervisor 910 includes a device driver layer 915, and maps physical resources of hardware platform 905 (e.g., processor 108, memory 110, network communication interface 812, and/or user interface device 810) to "virtual" resources of each of VMs $935_1$-$935_N$ such that each of VMs $935_1$-$935_N$ has its own virtual hardware platform (e.g., a corresponding one of virtual hardware platforms $940_1$-$940_N$), each virtual hardware platform having its own emulated hardware (such as a processor 945, a memory 950, a network communication interface 955, a user interface device 960 and other emulated I/O devices in VM $935_1$). Hypervisor 910 may manage (e.g., monitor, initiate, and/or terminate) execution of VMs $935_1$-$935_N$ according to policies associated with hypervisor 910, such as a policy specifying that VMs $935_1$-$935_N$ are to be automatically restarted upon unexpected termination and/or upon initialization of hypervisor 910. In addition, or alternatively, hypervisor 910 may manage execution VMs $935_1$-$935_N$ based on requests received from a device other than host computing device 106. For example, hypervisor 910 may receive an execution instruction specifying the initiation of execution of first VM $935_1$ from a management device via network communication interface 812 and execute the execution instruction to initiate execution of first VM $935_1$.

In some examples, memory 950 in first virtual hardware platform $940_1$ includes a virtual disk that is associated with or "mapped to" one or more virtual disk images stored on a disk (e.g., a hard disk or solid state disk) of host computing device 106. The virtual disk image represents a file system (e.g., a hierarchy of directories and files) used by first VM $935_1$ in a single file or in a plurality of files, each of which includes a portion of the file system. In addition, or alternatively, virtual disk images may be stored on one or more remote computing devices, such as in a storage area network (SAN) configuration. In such examples, any quantity of virtual disk images may be stored by the remote computing devices.

Device driver layer 915 includes, for example, a communication interface driver 920 that interacts with network communication interface 812 to receive and transmit data from, for example, a local area network (LAN) connected to host computing device 106. Communication interface driver 920 also includes a virtual bridge 925 that simulates the broadcasting of data packets in a physical network received from one communication interface (e.g., network communication interface 812) to other communication interfaces (e.g., the virtual communication interfaces of VMs $935_1$-$935_N$). Each virtual communication interface for each VM $935_1$-$935_N$, such as network communication interface 955 for first VM $935_1$, may be assigned a unique virtual Media Access Control (MAC) address that enables virtual bridge 925 to simulate the forwarding of incoming data packets from network communication interface 812. In an example, network communication interface 812 is an Ethernet adapter that is configured in "promiscuous mode" such that all Ethernet packets that it receives (rather than just Ethernet packets addressed to its own physical MAC address) are passed to virtual bridge 925, which, in turn, is able to further forward the Ethernet packets to VMs $935_1$-$935_N$. This configuration enables an Ethernet packet that has a virtual MAC address as its destination address to properly reach the VM in host computing device 106 with a virtual communication interface that corresponds to such virtual MAC address.

Virtual hardware platform $940_1$ may function as an equivalent of a standard x86 hardware architecture such that any x86-compatible desktop operating system (e.g., Microsoft WINDOWS brand operating system, LINUX brand operating system, SOLARIS brand operating system, NETWARE, or FREEBSD) may be installed as guest operating system (OS) 965 in order to execute applications 970 for an instantiated VM, such as first VM 935₁. Virtual hardware platforms 940₁-940ₙ may be considered to be part of virtual machine monitors (VMM) 975₁-975ₙ that implement virtual system support to coordinate operations between hypervisor 910 and corresponding VMs 935₁-935ₙ. Those with ordinary skill in the art will recognize that the various terms, layers, and categorizations used to describe the virtualization components in FIG. 10 may be referred to differently without departing from their functionality or the spirit or scope of the disclosure. For example, virtual hardware platforms 940₁-940ₙ may also be considered to be separate from VMMs 975₁-975ₙ, and VMMs 975₁-975ₙ may be considered to be separate from hypervisor 910. One example of hypervisor 910 that may be used in an example of the disclosure is included as a component in VMware's ESX brand software, which is commercially available from VMware, Inc.

The operations described herein may be performed by a computer or computing device. The computing devices communicate with each other through an exchange of messages and/or stored data. Communication may occur using any protocol or mechanism over any wired or wireless connection. A computing device may transmit a message as a broadcast message (e.g., to an entire network and/or data bus), a multicast message (e.g., addressed to a plurality of other computing devices), and/or as a plurality of unicast messages, each of which is addressed to an individual computing device. Further, in some embodiments, messages are transmitted using a network protocol that does not guarantee delivery, such as User Datagram Protocol (UDP). Accordingly, when transmitting a message, a computing device may transmit multiple copies of the message, enabling the computing device to reduce the risk of non-delivery.

By way of example and not limitation, computer readable media comprise computer storage media and communication media. Computer storage media include volatile and nonvolatile, removable and non-removable media implemented in any method or technology for storage of information such as computer readable instructions, data structures, program modules or the like. Computer storage media are tangible, non-transitory, and are mutually exclusive to communication media. In some embodiments, computer storage media are implemented in hardware. Exemplary computer storage media include hard disks, flash memory drives, digital versatile discs (DVDs), compact discs (CDs), floppy disks, tape cassettes, and other solid-state memory. In contrast, communication media typically embody computer readable instructions, data structures, program modules, or the like in a modulated data signal such as a carrier wave or other transport mechanism, and include any information delivery media.

Although described in connection with an exemplary computing system environment, embodiments of the disclosure are operative with numerous other general purpose or special purpose computing system environments or configurations. Examples of well-known computing systems, environments, and/or configurations that may be suitable for use with aspects of the disclosure include, but are not limited to, mobile computing devices, personal computers, server computers, hand-held or laptop devices, multiprocessor systems, gaming consoles, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein.

Aspects of the disclosure transform a general-purpose computer into a special-purpose computing device when programmed to execute the instructions described herein. Specifically, the instructions described in the flow charts of FIGS. 6-8, when executed, transform a general-purpose computer into a special-purpose computing device configured to migrate changes in distributed or shared memory from a primary cluster to a secondary cluster.

Certain examples described herein involve a hardware abstraction layer on top of a host computer (e.g., server). The hardware abstraction layer allows multiple containers to share the hardware resource. These containers, isolated from each other, have at least a user application running therein. The hardware abstraction layer thus provides benefits of resource isolation and allocation among the containers. In the foregoing examples, VMs are used as an example for the containers and hypervisors as an example for the hardware abstraction layer. Each VM generally includes a guest operating system in which at least one application runs.

It should be noted that these examples may also apply to other examples of containers, such as containers not including a guest operating system, referred to herein as "OS-less containers" (see, e.g., www.docker.com). OS-less containers implement operating system-level virtualization, wherein an abstraction layer is provided on top of the kernel of an operating system on a host computer. The abstraction layer supports multiple OS-less containers each including an application and its dependencies. Each OS-less container runs as an isolated process in user space on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O.

The embodiments illustrated and described herein as well as embodiments not specifically described herein but within the scope of aspects of the disclosure constitute exemplary means for migrating a distributed application across two distinct infrastructures. For example, the components illustrated in the Figures, when performing the operations illustrated in the Figures, constitute exemplary means for taking a snapshot of a volume on which an application is running on a first cluster (e.g., a production cluster); exemplary means for creating an exo-clone diff on the first cluster; exemplary means for copying the created exo-clone diff to a second cluster (e.g., a test/dev cluster); and exemplary means for importing and applying the exo-clone diff on the second cluster.

At least a portion of the functionality of the various elements illustrated in the figures may be performed by other elements in the figures, or an entity (e.g., processor, web service, server, application program, computing device, etc.) not shown in the figures.

In some embodiments, the operations illustrated in the figures may be implemented as software instructions encoded on a computer readable medium, in hardware programmed or designed to perform the operations, or both. For example, aspects of the disclosure may be implemented as a system on a chip or other circuitry including a plurality of interconnected, electrically conductive elements.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements. The term "exemplary" is intended to mean "an example of."

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

Additional Examples

The VDFS exo-clones may be compared to existing solutions for two customer use cases: (1) application deployment and distribution when upgrading the underlying OS, libraries, or packages used by a tool set, and (2) migrating a stateful application running within a container.

Developers build applications on top of a base layer. In Docker, this is often the UBUNTU base layer, which is just the Ubuntu LTS distribution. When a change happens to the UBUNTU base layer, all containers built on top must be rebuilt. To rebuild a container, the new base layer must be pulled, requiring downloading an entirely new image from a remote server (e.g., Docker Hub) or perhaps some nearby image repository. In the case of exo-clones, a new base layer may also be transferred to each separate application environment on which to run after a base layer update.

Comparing how much data must be sent to the application environment, both for Docker and VDFS exo-clones, when a base layer is updated, demonstrates some of the improvements provided by the present disclosure.

Because the UBUNTU base layer is updated less frequently (e.g., six month intervals, typically for security), it also makes sense to look at another base layer that may be transmitted more frequently, but also specific to an organization. This analysis focuses on two versions of ESXi built one week apart as a PXE-bootable image.

Table 3 shows example results. The first column lists the older and newer versions of Ubuntu LTS 14.04 and the older and newer versions of ESXi, as well as the size of a hypothetical "upgrade" patch. It is important to note that exo-clones support a Dedup UUID section that can allow a more recent base image (e.g., 14.04.3) to deduplicate itself against a prior version (14.04.2) which effectively creates an upgrade patch. Docker does not support this, and adding such functionality creates a management task for users of Docker that would be onerous. With VDFS, two VDFS instances can automatically negotiate appropriate UUIDs to deduplicate and create an incremental upgrade patch. Hypothetical WHOLE FILE numbers for Docker are included for comparison. In Table 3, sending all of Ubuntu 14.04.3 even when the receiving party already has 14.04.2 only consumes 23 MB with exo-clones compared to 199 MB as a file archive as Docker would send it.

Docker containers need to support union file systems (AUFS or Overlay FS) to merge layers, which limits their layer format to include whole files. Even if docker can support device mapper or other native COW file systems like btrfs and zfs. VDFS exo-clones can use variable chunk deduplication. Table 3 below shows VDFS exo-clones are 176 MB or 88% smaller for an LTS base image update compared to Docker pulling the full 199 MB image:

TABLE 3

Projected Container Image Sizes

|  | Whole file | 6-9 kb var. chunk |
| --- | --- | --- |
| 14.04.2 | 199 MB | 177 MB |
| 14.04.3 | 199 MB | 177 MB |
| lts upgrade | 58 MB | 23 MB |
| pxe-vsan-1 | 392 MB | 380 MB |
| pxe-vsan-2 | 377 MB | 370 MB |
| pxe upgrade | 376 MB | 282 MB |

Even compared to a hypothetical whole-file implementation, the LTS base image update is still 35 MB (or 60%) smaller. Similarly, VDFS exo-clones are 94 MB (or 25%) smaller for a base image update compared to a hypothetical whole-file implementation.

Moreover, Docker uses a "union file system" mechanism to create space-efficient application deployment images. However, it can only generate diff at the file level. Other systems have used the metaphor of a volume to track changes to whole applications, such as App Volumes. App Volumes allows businesses to deliver applications to View virtual desktops (e.g., VDI). App Volumes supports a read-only AppStack that installs major applications like Java or Adobe, and a writable per-user volume. Unlike the VDFS exo-clones disclosed herein, writable per-user volumes cannot be shared or reassigned to multiple users.

Some local file systems, like ZFS and BtrFS, have the ability to send and receive volume snapshots using custom stream format. But they stop short at both efficiency (zero-copy) and change tracking features (merge and rebase).

Source version control systems like Perforce and various Git extensions (git-annex, git-media, git-lfs, and the like) have their own ways to support binary files by only versioning metadata and store the binary data whole. However, git is inefficient to handle large binary files. Since these tools are not in the IO path, they must track changes made to a separate working directory, and cannot utilize copy-on-write making them inefficient for tracking whole volumes and also cannot provide consistent point-in-time snapshots.

We claim:

1. A method for migrating changes to an application from a primary cluster to a secondary cluster, wherein the primary cluster and the secondary cluster respectively operate volumes associated with the application on different file systems, said method comprising:
    creating a clone volume of the primary cluster, wherein the clone volume includes both an original volume of the primary cluster and one or more changes to the original volume of the primary cluster;
    performing a diff operation between the clone volume and the original volume of the primary cluster to determine differences to one or more block chains of data in the primary cluster since said creating;
    creating a file that includes a data section comprising the differences to the one or more block chains of data in the primary cluster;
    receiving, on the primary cluster, a list of files from the secondary cluster;
    determining that the created file has duplicate content that is already in the list of files;
    deduplicating the created file against one or more of the list of files to generate a deduplicated file; and
    transmitting the deduplicated file to the secondary cluster for applying differences to the one or more block chains of data in the data section of the deduplicated file to another volume on the secondary cluster, wherein the primary cluster operates in a production mode of operation and the secondary cluster operates in a test or development mode of operation.

2. The method of claim 1, wherein a shared volume is hosted on the primary cluster and the secondary cluster, the method further comprising:
    packaging changes made to the shared volume on the primary cluster in the created file along with an identifier of the shared volume; and
    transmitting the created file to the secondary cluster for implementation of the changes to the shared volume managed on the secondary cluster.

3. The method of claim 1, wherein the created file includes a metadata section comprising a universally unique identifier (UUID) of the primary cluster and the generated deduplicated file lists one or more UUIDs of the one or more of the list of files.

4. The method of claim 1, further comprising storing the deduplicated file in a Virtual Distributed File System (VDFS) that is accessible by one or more other clusters.

5. The method of claim 3, further comprising encoding a file system tree in the metadata section into the data section of the created file.

6. The method of claim 1, further comprising mounting the deduplicated file on the volume of the secondary cluster in a zero-copy manner.

7. The method of claim 1, wherein the created file further comprises state information for the application that is running in a stateful container on the primary cluster.

8. The method of claim 1, wherein the created file is a first file, and further comprising:
    performing another diff operation of the original volume to determine differences to other block chains of data in the original volume;
    making a second file comprising the differences to the other block chains of data in the original volume;
    merging the first file and the second file into a merged file that includes the differences to the one or more block chains of data and the other block chains of data in the original volume;
    determining that the merged file has duplicate content that is already in the list of files;
    deduplicating the merged file against one or more of the list of files to generate a second deduplicated file; and
    transmitting the second deduplicated file to the secondary cluster.

9. The method of claim 8, wherein the second file comprises a content UUID associated with the first file.

10. The method of claim 8, further comprising:
    assigning the merged file a reference count that refers to the merged file making the merged file read-only; and
    incrementing one or more UUIDs of the first file or the second file.

11. A computing system for migrating changes to an application from a primary cluster to a secondary cluster, wherein the primary cluster and the secondary cluster respectively operate volumes associated with the application on different file systems, said computing system comprising:
    one or more processors; and
    a non-transitory computer readable medium having stored thereon program code for transferring data to another computer system, the program code causing the one or more processors to:
        create a clone volume of the primary cluster, wherein the clone volume includes both an original volume of the primary cluster and one or more changes to the original volume of the primary cluster;
        perform a diff operation between the clone volume and the original volume of the primary cluster to determine differences to one or more block chains of data in the primary cluster since the created clone volume;
        create a file that includes a data section comprising the differences to the one or more block chains of data in the primary cluster;
        receive, on the primary cluster, a list of files from the secondary cluster;
        determine that the created file has duplicate content that is already in the list of files;
        deduplicate the created file against one or more of the list of files to generate a deduplicated file; and
        transmit the deduplicated file to the secondary cluster for applying differences to the one or more block chains of data in the data section of the deduplicated file to another volume on the secondary cluster, wherein the primary cluster operates in a production mode of operation and the secondary cluster operates in a test or development mode of operation.

12. The computing system of claim 11, wherein the primary cluster comprises a container that includes the one or more block chains of data having the differences.

13. The computing system of claim 11, wherein a shared volume is hosted on the primary cluster and the secondary cluster, the program code further causing the one or more processors to:
    package changes made to the shared volume on the primary cluster in the created file along with an identifier of the shared volume; and
    transmit the created file to the secondary cluster for implementation of the changes to the shared volume managed on the secondary cluster.

14. The computing system of claim 11, wherein the program code is configured for causing the one or more processors to:
receive one or more other files at the secondary cluster; and
deduplicate the one or more other files relative to the data section of the deduplicated file.

15. The computing system of claim 11, wherein the program code is configured for storing the deduplicated file in a Virtual Distributed File System (VDFS) that is accessible by one or more other clusters, wherein the deduplicated file is created by creating an empty file, adding a universally unique identifier (UUID) of a parent file to the empty file, and adding another UUID specific to the empty file.

16. The computing system or claim 11, wherein the deduplicated file comprises at least one member of a group comprising: a parent UUID, a dedup UUID, or commit metadata, wherein the commit metadata contains descriptive information of the deduplicated file for parsing by user-level tools that cannot mount the deduplicated file directly.

17. A non-transitory computer readable medium having stored thereon program code executable by a first computer system at a first site, the program code embodying a method for migrating changes to an application from a primary cluster to a secondary cluster, wherein the primary cluster and the secondary cluster respectively operate volumes associated with the application on different file systems, the method comprising:
creating a clone volume of a primary cluster, wherein the clone volume includes both an original volume of the primary cluster and one or more changes to the original volume of the primary cluster;
performing a diff operation between the clone volume and the original volume of the primary cluster to determine first differences to one or more block chains of data in the primary cluster since said creating;
creating a first file that includes a first data section comprising the first differences to the one or more block chains of data in the primary cluster;
receiving, on the primary cluster, a list of files from the secondary cluster;
determining that the first file has duplicate content that is already in the list of files;
deduplicating the first file against one or more of the list of files to generate a deduplicated file; and
transmitting the deduplicated file to the secondary cluster for applying differences to the one or more block chains of data in the data section of the deduplicated file to another volume on the secondary cluster, wherein the primary cluster operates in a production mode of operation and the secondary cluster operates in a test or development mode of operation.

18. The non-transitory computer readable medium of claim 17, wherein the first file comprises state information of at least a portion of content of the first file, the state information comprising a parent universally unique identifier (UUID) associated with the primary cluster.

19. The non-transitory computer readable medium of claim 17, further comprising:
performing a zero-copy import of the deduplicated file on the secondary cluster.

20. The non-transitory computer readable medium of claim 17, further comprising:
performing a second diff operation between the clone volume and the original volume of the primary cluster to determine second differences to the one or more block chains of data in the primary cluster beyond the first differences to the one or more block chains of data;
creating a second file that includes a data section comprising the second differences to the one or more block chains of data in the primary cluster; and
transmitting the second file to the secondary cluster for applying the second differences to the one or more block chains of data in the data section of the second file to said another volume on the secondary cluster.

* * * * *